United States Patent
Lin et al.

(10) Patent No.: US 11,363,276 B2
(45) Date of Patent: Jun. 14, 2022

(54) INTRA-FRAME PREDICTION METHOD AND APPARATUS, VIDEO CODING DEVICE, AND STORAGE MEDIUM

(71) Applicant: TENCENT TECHNOLOGY (SHENZHEN) COMPANY LIMITED, Shenzhen (CN)

(72) Inventors: Sixin Lin, Shenzhen (CN); Ximing Cheng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/590,424

(22) Filed: Oct. 2, 2019

(65) Prior Publication Data
US 2020/0036984 A1 Jan. 30, 2020

Related U.S. Application Data

(63) Continuation of application No. PCT/CN2018/103636, filed on Aug. 31, 2018.

(30) Foreign Application Priority Data

Sep. 28, 2017 (CN) .......................... 201710901193.1

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/124* (2014.11);
(Continued)

(58) Field of Classification Search
None
See application file for complete search history.

(56) References Cited

U.S. PATENT DOCUMENTS 8,472,522 B2 6/2013 Matsuo et al.
2008/0304763 A1* 12/2008 Nagori ................. H04N 19/61
382/250
(Continued)

FOREIGN PATENT DOCUMENTS

CN 101494792 A 7/2009
CN 102006481 A 4/2011
(Continued)

OTHER PUBLICATIONS

Pan et al., "Fast Intra Mode Decision Algorithm for H.264IAVC Video Coding" (Year: 2004).*

(Continued)

*Primary Examiner* — Mohammed Jebari
(74) *Attorney, Agent, or Firm* — ArentFox Schiff LLP

(57) ABSTRACT

Embodiments of the present disclosure provide an intra-frame prediction method and apparatus, and a non-transitory computer-readable storage medium. In the method, pixel main directions of reference coded blocks that spatially neighbor a target to-be-coded block are determined. For each of the pixel main directions, a search is performed for an intra-frame prediction direction that is within a set distance value of the respective pixel main direction. Candidate intra-frame prediction directions are formed at least according to the intra-frame prediction directions. Prediction and coding are performed on the target to-be-coded block according to the candidate intra-frame prediction directions. Further, a target intra-frame prediction direction in the candidate intra-frame prediction directions is determined according to results of the prediction and coding on the (Continued)

target to-be-coded block according to the candidate intra-frame prediction directions.

20 Claims, 11 Drawing Sheets

(51) Int. Cl.
    *H04N 19/124*     (2014.01)
    *H04N 19/147*     (2014.01)
    *H04N 19/176*     (2014.01)
    *H04N 19/182*     (2014.01)
    *H04N 19/593*     (2014.01)
    *H04N 19/61*     (2014.01)

(52) U.S. Cl.
    CPC ......... *H04N 19/147* (2014.11); *H04N 19/176* (2014.11); *H04N 19/182* (2014.11); *H04N 19/593* (2014.11); *H04N 19/61* (2014.11)

(56) References Cited

U.S. PATENT DOCUMENTS

| | | | | |
|---|---|---|---|---|
| 2009/0225834 | A1* | 9/2009 | Song | H04N 19/11 |
| | | | | 375/240.12 |
| 2010/0027655 | A1 | 2/2010 | Matsuo et al. | |
| 2012/0014443 | A1* | 1/2012 | Maani | H04N 19/463 |
| | | | | 375/240.12 |
| 2012/0020580 | A1* | 1/2012 | Sasai | H04N 19/14 |
| | | | | 382/233 |
| 2013/0114713 | A1* | 5/2013 | Bossen | H04N 19/11 |
| | | | | 375/240.12 |
| 2014/0003518 | A1* | 1/2014 | Bang | H04N 19/597 |
| | | | | 375/240.14 |
| 2014/0233645 | A1* | 8/2014 | Sakamoto | H04N 19/107 |
| | | | | 375/240.13 |
| 2015/0016521 | A1* | 1/2015 | Peng | H04N 19/192 |
| | | | | 375/240.12 |
| 2016/0073114 | A1* | 3/2016 | Kawamura | H04N 19/136 |
| | | | | 375/240.03 |
| 2017/0272757 | A1 | 9/2017 | Xu et al. | |
| 2020/0145668 | A1* | 5/2020 | Kotra | H04N 19/136 |

FOREIGN PATENT DOCUMENTS

| | | |
|---|---|---|
| CN | 102438148 A | 5/2012 |
| CN | 103517069 A | 1/2014 |
| CN | 103686183 A | 3/2014 |
| JP | 2006-523073 | 10/2006 |
| JP | 2008-283481 | 11/2008 |
| JP | 2014-225795 | 12/2014 |
| JP | 2016-511975 | 4/2016 |
| WO | 2010/087157 | 8/2010 |

OTHER PUBLICATIONS

Korean Office Action dated Nov. 26, 2020 in Application No. 10-2019-7035772, (8 pages).
Han et al., "Improvements for Intra Prediction Mode Coding," JVET-G0060, 7th Meeting: Torino, IT, Jul. 13-21, 2017 (4 pages).
Japanese Office Action dated Jan. 4, 2021 in Application No. 2019-560675, (4 pages).
Office Action dated Oct. 7, 2021 issued in corresponding Indian patent application No. 201947044771 (5 pages).
Wang et al.—"An Improved Fast Intra-prediction Algorithm in H.264/AVC Based on Edge Feature", 2008 International Conference on Computer Science and Software Engineering, published Dec. 22, 2008
Hongxia et al.—"Fast Intraprediction Mode Selection Algorithm Based on Adjacent Blocks Prediction for H.264", Journal of Jiangnan University (Nautral Science Edition). vol. 9, No. 4, published Aug. 31, 2010
Pan et al.—"Fast Mode Decision for Intra Prediction", Joint Video Team (JVT) of ISO/IEC MPEG & ITU-T VCEG (ISO/IED JTC1/SC29/WG11 and ITU-T SG16 Q.6) 7th Meeting: Pattaya II, Thailand, Mar. 7-14, 2003, Document: JVET-GO13, Filename: JVT-G013.doc.
Office Action dated Nov. 23, 2021 issued in corresponding Chinese patent application No. 201710901193.1 (with English translation).

\* cited by examiner

INTRA-FRAME PREDICTION METHOD AND APPARATUS, VIDEO CODING DEVICE, AND STORAGE MEDIUM

RELATED APPLICATION

This application is a continuation of International Application No. PCT/CN2018/103636, filed on Aug. 31, 2018, which claims priority to Chinese Patent Application No. 201710901193.1, entitled "INTRA-FRAME PREDICTION METHOD AND APPARATUS, AND STORAGE MEDIUM" filed on Sep. 28, 2017. The entire disclosures of the prior applications are hereby incorporated by reference in their entirety.

FIELD OF THE TECHNOLOGY

The present disclosure relates to the field of video processing technologies, and specifically, to an intra-frame prediction technology.

BACKGROUND OF THE DISCLOSURE

Intra-frame prediction is a link of video coding. Through intra-frame prediction, spatial redundancy information during video coding may be eliminated, and a video coding effect may be optimized. Intra-frame prediction is especially applied in video coding of a mixed coding framework such as H.264/AVC, H.265/HEVC, and AVS.

Intra-frame prediction is a process of performing prediction and coding on a target to-be-coded block by using a target intra-frame prediction direction of the target to-be-coded block. An important content of performing intra-frame prediction on the target to-be-coded block is: selecting an intra-frame prediction direction with an optimal target to-be-coded block from a plurality of intra-frame prediction directions as the target intra-frame prediction direction, and performing final prediction and coding on the target to-be-coded block by using the target intra-frame prediction direction. That is, the target intra-frame prediction direction is an intra-frame prediction direction in the plurality of intra-frame prediction directions for the target to-be-coded block. In addition to performing prediction and coding on the target to-be-coded block by using the selected target intra-frame prediction direction, the selected target intra-frame prediction direction may also be written in a bitstream, to be transferred to a decoder to decode the target to-be-coded block.

In a current intra-frame prediction implementation process, a selection manner of the target intra-frame prediction direction is mainly: roughly selecting an intra-frame prediction direction from all intra-frame prediction directions and using the roughly selected intra-frame prediction direction and a target intra-frame prediction direction of a coded block near a determined target to-be-coded block as candidate intra-frame prediction directions, and finely selecting a target intra-frame prediction direction of the target to-be-coded block from the candidate intra-frame prediction directions. A problem existing in this manner is: selection of the target intra-frame prediction direction is complex, causing that complexity of video coding is high, and a real-time requirement of video coding cannot be met.

SUMMARY

In view of the above, embodiments of the present disclosure provide an intra-frame prediction method and apparatus, and a non-transitory computer-readable storage medium, to lower selection complexity of a target intra-frame prediction direction, so that complexity of video coding is lowered, and a real-time requirement of video coding is met.

To achieve the foregoing objective, the embodiments of the present disclosure provide the following technical solutions:

In an embodiment, there is provided an intra-frame prediction method of a video coding device. The method includes determining pixel main directions of reference coded blocks that spatially neighbor a target to-be-coded block. For each of the pixel main directions, a search is performed for an intra-frame prediction direction that is within a set distance value of the respective pixel main direction. Candidate intra-frame prediction directions are formed at least according to the intra-frame prediction directions. Prediction and coding are performed on the target to-be-coded block according to the candidate intra-frame prediction directions. A target intra-frame prediction direction in the candidate intra-frame prediction directions is determined according to results of the prediction and coding on the target to-be-coded block according to the candidate intra-frame prediction directions.

In one embodiment, for one of the pixel main directions, a search is performed for the intra-frame prediction direction with a distance value that is less than a pixel main direction set value of the respective pixel main direction and a search is performed for another intra-frame prediction direction with a distance value that is greater than the pixel main direction set value of the respective pixel main direction.

In one embodiment, for one of the reference coded blocks, directions of pixels of the reference coded block are determined. Further, one of the directions with a largest quantity of pixels in the reference coded block is used as the pixel main direction of the one of the reference coded blocks.

In one embodiment, a first average value of an upper set-row re-established pixel connected to the target to-be-coded block and a second average value of a left set-row re-established pixel connected to the target to-be-coded block are determined. A determination is made as to whether an absolute error between the first average value and the second average value is less than a first threshold and whether the target intra-frame prediction directions of the reference coded blocks are all a first set intra-frame prediction direction. Determination of the pixel main directions of the reference coded blocks is triggered in a case that at least one of (i) the absolute error between the first average value and the second average value is not less than the first threshold, or (ii) none of the target intra-frame prediction directions of the reference coded blocks are the first set intra-frame prediction direction.

In one embodiment, the target intra-frame prediction direction of the target to-be-coded block is the first set intra-frame prediction direction in a case that (i) the absolute error between the first average value and the second average value is less than the first threshold, and (ii) the target intra-frame prediction directions of the reference coded blocks are all the first set intra-frame prediction direction.

In one embodiment, the candidate intra-frame prediction directions are determined to include the first set intra-frame prediction direction, a second set intra-frame prediction direction, the intra-frame prediction directions, and the pixel main directions in a case that at least one of (i) the absolute error between the first average value and the second average value is not greater than a second threshold, or (ii) the target intra-frame prediction directions of the reference coded blocks are all the first set intra-frame prediction direction or the second set intra-frame prediction direction. The candidate intra-frame prediction directions are determined to include the intra-frame prediction directions and the pixel main directions in a case that (i) the absolute error between the first average value and the second average value is greater than the second threshold, and (ii) none of the target intra-frame prediction directions of the reference coded blocks are the first set intra-frame prediction direction or the second set intra-frame prediction direction.

In an embodiment, the reference coded blocks include a first coded block connected to a left side of an upper corner of the target to-be-coded block and a second coded block connected to an upper side of a left corner of the target to-be-coded block.

In an embodiment, rate distortion costs corresponding to the candidate intra-frame prediction directions are determined according to the results of the prediction and coding on the target to-be-coded block according to the candidate intra-frame prediction directions. One of the candidate intra-frame prediction directions with a smallest rate distortion cost is selected as the target intra-frame prediction direction.

In an embodiment, intra-frame prediction residuals corresponding to the candidate intra-frame prediction directions obtained after the prediction and coding are performed on the target to-be-coded block are determined according to the candidate intra-frame prediction directions. Transform and quantization are performed on the intra-frame prediction residuals corresponding to the candidate intra-frame prediction directions, to obtain transform and quantization results corresponding to the candidate intra-frame prediction directions. Inverse quantization and inverse transform are performed on the transform and quantization results corresponding to the candidate intra-frame prediction directions, to obtain a pixel re-establishment value of the target to-be-coded block corresponding to the candidate intra-frame prediction directions. Further, rate distortion costs corresponding to the candidate intra-frame prediction directions are determined according to the pixel re-establishment value of the target to-be-coded block corresponding to the candidate intra-frame prediction directions and a pixel original value of the target to-be-coded block.

In one embodiment, there is provided an intra-frame prediction method, applied to a video coding device. In the method, pixel main directions of reference coded blocks in the reference coded blocks spatially neighboring to a target to-be-coded block are determined. Separate searches are performed for an intra-frame prediction direction whose distance with the pixel main directions is within a set value, to obtain the intra-frame prediction directions correspondingly found through the pixel main directions. Candidate intra-frame prediction directions are formed at least according to the intra-frame prediction directions correspondingly found through the pixel main directions and the pixel main directions. Prediction and coding on the target to-be-coded block are performed according to the candidate intra-frame prediction directions, and a target intra-frame prediction direction in the candidate intra-frame prediction directions is determined according to prediction and coding results respectively corresponding to the candidate intra-frame prediction directions.

In one embodiment, there is provided an intra-frame prediction apparatus, applied to a video coding device. The video coding devices includes a pixel main direction determining module, a prediction direction searching module, a candidate prediction direction determining module, and a target intra-frame prediction direction determining module. The pixel main direction determining module, is configured to determine pixel main directions of reference coded blocks in the reference coded blocks spatially neighboring to a target to-be-coded block. The prediction direction searching module, is configured to separately search for an intra-frame prediction direction whose distance with the pixel main directions is within a set value, to obtain the intra-frame prediction directions correspondingly found through the pixel main directions. The candidate prediction direction determining module, is configured to form candidate intra-frame prediction directions at least according to the intra-frame prediction directions correspondingly found through the pixel main directions and the pixel main directions. The target intra-frame prediction direction determining module, is configured to perform prediction and coding on the target to-be-coded block according to the candidate intra-frame prediction directions, and determine a target intra-frame prediction direction in the candidate intra-frame prediction directions according to prediction and coding results respectively corresponding to the candidate intra-frame prediction directions.

In one embodiment, there is provided a video coding device, including a memory and a processor. The memory is configured to store information. The processor is connected to the memory and configured to execute, by executing a computer program stored in the memory: determining pixel main directions of reference coded blocks in the reference coded blocks spatially neighboring to a target to-be-coded block; separately searching for an intra-frame prediction direction whose distance with the pixel main directions is within a set value, to obtain the intra-frame prediction directions correspondingly found through the pixel main directions; forming candidate intra-frame prediction directions at least according to the intra-frame prediction directions correspondingly found through the pixel main directions and the pixel main directions; and performing prediction and coding on the target to-be-coded block according to the candidate intra-frame prediction directions, and determining a target intra-frame prediction direction in the candidate intra-frame prediction directions according to prediction and coding results respectively corresponding to the candidate intra-frame prediction directions.

In some embodiments, an information processing apparatus is provided that is configured to perform any of the intra-frame prediction methods. In some embodiments, a non-transitory computer-readable medium is provided. The non-transitory computer-readable medium stores instructions which when executed by at least one processor (e.g., a central processing unit or a graphic processing unit) cause the at least one processor to perform any of the intra-frame prediction methods An embodiment of the present disclosure further provides a computer program product, including an instruction, when being run on a computer, the instruction causing the computer to perform any of the intra-frame prediction methods.

Based on the foregoing technical solutions, in the embodiments of the present disclosure, based on pixel main directions of reference coded blocks spatially neighboring to a target to-be-coded block, an intra-frame prediction direction whose distance with the pixel main directions is within a set value, and candidate intra-frame prediction directions are formed at least according to the intra-frame prediction directions correspondingly found through the pixel main directions and the pixel main directions, to perform prediction and coding on the target to-be-coded block according to the candidate intra-frame prediction directions, and a target intra-frame prediction direction is determined in the candidate intra-frame prediction directions according to prediction and coding results respectively corresponding to the candidate intra-frame prediction directions. In the embodiments of the present disclosure, the candidate intra-frame prediction directions may be formed at least according to the intra-frame prediction directions correspondingly found through the pixel main directions and the pixel main directions, a quantity of the candidate intra-frame prediction directions is reduced, and the target intra-frame prediction direction is controlled to make a choice directly based on the determined candidate intra-frame prediction directions, avoiding a process of rough selection based on all the intra-frame prediction directions, lowering processing complexity of selection of the target intra-frame prediction direction, and lowering whole complexity of video coding, to ensure real-time of video coding.

BRIEF DESCRIPTION OF THE DRAWINGS

To describe the technical solutions in the embodiments of the present disclosure or in the related technology more clearly, the following briefly describes the accompanying drawings required for describing the embodiments. The accompanying drawings in the following description show merely some embodiments of the present disclosure, and a person of ordinary skill in the art may still derive other drawings from these provided accompanying drawings.

DESCRIPTION OF EMBODIMENTS

Figure 1:
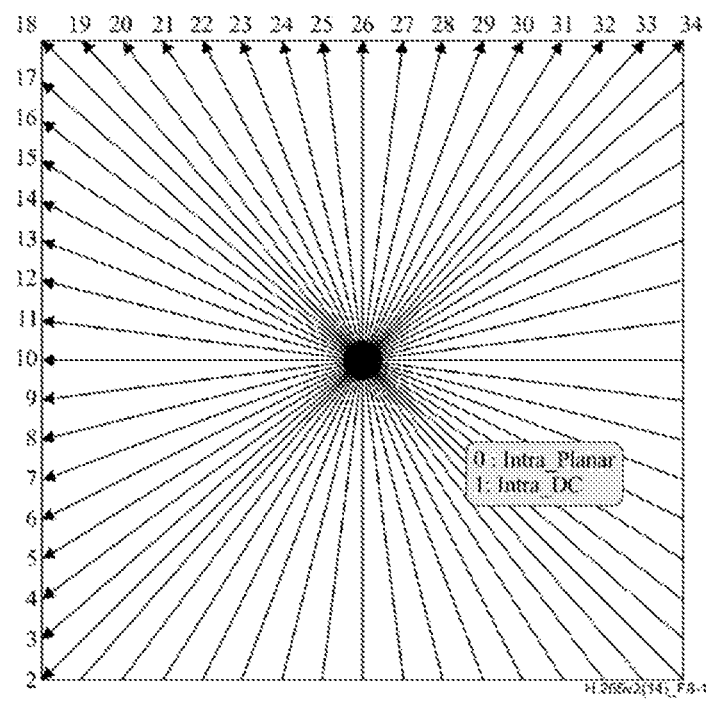
FIG. 1 is an example diagram of all intra-frame prediction directions.

Using video coding in a High Efficiency Video Coding (HEVC) manner as an example, current HEVC has 35 intra-frame prediction directions in total. As shown in FIG. 1, a number in FIG. 1 represents an intra-frame prediction direction. In the related technology, when intra-frame prediction is performed on a target to-be-coded block, prediction and coding need to be performed on the target to-be-coded block by using the 35 intra-frame prediction directions, N (N is an integer less than 35 and may be pre-defined) intra-frame prediction directions with smallest video residuals may be roughly selected from the 35 intra-frame prediction directions, and the N intra-frame prediction directions are used as candidate intra-frame prediction directions. In addition, a target intra-frame prediction direction selected by a coded block near the target to-be-coded block is also added into the candidate intra-frame prediction directions, then prediction and coding are performed on the target to-be-coded block by using the candidate intra-frame prediction directions, and an intra-frame prediction direction with a smallest rate distortion cost is selected from the candidate intra-frame prediction directions as a target intra-frame prediction direction of the target to-be-coded block.

It may be learned that in an existing intra-frame prediction process using HEVC as an example, all the 35 intra-frame prediction directions need to be roughly selected by first calculating a video residual, then the roughly selected intra-frame prediction directions and the target intra-frame prediction direction selected by the coded block nearby are used as the candidate intra-frame prediction directions, and the target intra-frame prediction direction of the target to-be-coded block is finely selected from the candidate intra-frame prediction directions by calculating rate distortion costs. This manner requires sequentially performing intra-frame prediction of two stages (that is, a first stage is performing intra-frame prediction on the target to-be-coded block by using all the intra-frame prediction directions, and a second stage is performing intra-frame prediction on the target to-be-coded block by using the candidate intra-frame prediction directions) on the target to-be-coded block. It may be learned that complexity of a current process of selecting the target intra-frame prediction direction of the target to-be-coded block is high, causing whole complexity of video coding to be high and affecting real-time of video coding.

Therefore, the intra-frame prediction direction is optimized, a quantity of the candidate intra-frame prediction directions is reduced, and selection of the target intra-frame prediction direction of the target to-be-coded block is controlled in a process of intra-frame prediction of one stage, to lower selection complexity of the target intra-frame prediction direction, lower whole complexity of video coding, and ensuring a real-time requirement of video coding.

Based on the above, the following clearly describes the technical solutions in the embodiments of the present disclosure with reference to the accompanying drawings in the embodiments of the present disclosure. The described embodiments are some embodiments of the present disclosure rather than all of the embodiments. All other embodiments obtained by a person of ordinary skill in the art based on the embodiments of the present disclosure shall fall within the protection scope of the present disclosure.

Figure 2:
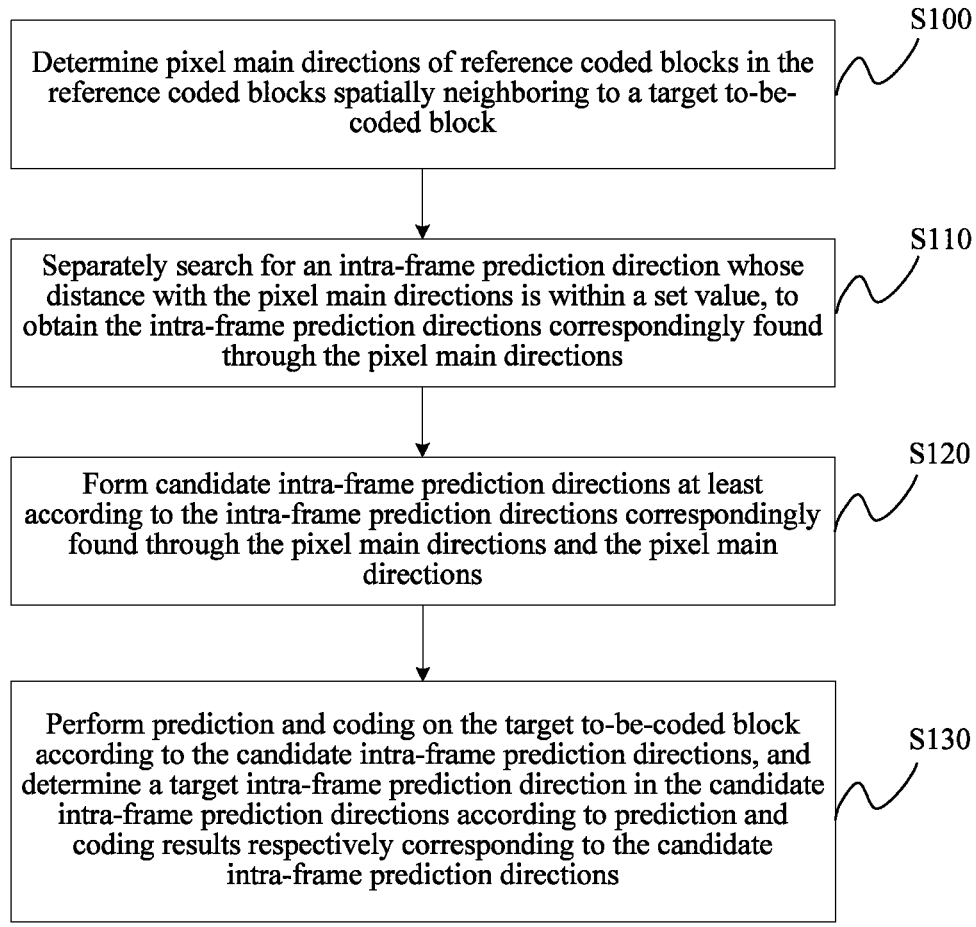
FIG. 2 is a flowchart of an intra-frame prediction method according to an embodiment of the present disclosure.

FIG. 2 is a flowchart of an intra-frame prediction method according to an embodiment of the present disclosure. The intra-frame prediction method may be applied to a video coding device. The video coding device may include processing circuitry such as a central processing unit (CPU) or a graphic processing unit (GPU) having a video coding capacity. In some embodiments, the video coding device may be implemented as a terminal a mobile phone or a notebook computer or may be implemented as a server.

Referring to FIG. 2, the intra-frame prediction method provided in this embodiment of the present disclosure may include:

Step S100: Determine pixel main directions of reference coded blocks in the reference coded blocks spatially neighboring to a target to-be-coded block.

The target to-be-coded block may be understood as a to-be-coded block on which prediction and coding currently need to be performed. The coded block may be regarded as a to-be-coded block on which prediction and coding are performed by using the target intra-frame prediction direction determined by using the intra-frame prediction method provided in this embodiment of the present disclosure.

Optionally, the coded block is also referred to a re-established to-be-coded block. A to-be-coded block becomes a coded block after prediction and coding are performed on the to-be-coded block through the determined target intra-frame prediction direction, and pixels in the coded block are processed and re-established. For example, for any to-be-coded block, after prediction and coding are performed on the to-be-coded block by using the target intra-frame prediction direction of the to-be-coded block determined by the intra-frame prediction method provided in this embodiment of the present disclosure, an intra-frame prediction residual of the to-be-coded block may be obtained, transform and quantization are performed on the intra-frame prediction residual, and then inverse quantization and inverse transform are performed, to obtain a pixel re-establishment value of the to-be-coded block, so that pixels of the to-be-coded block are established after prediction and coding are performed on the to-be-coded block through the target intra-frame prediction direction.

Optionally, the selected reference coded block spatially neighboring to the target to-be-coded block may be: a coded block spatially neighboring to the target to-be-coded block and connected to a corner of the target to-be-coded block. Based on information provided after the reference coded block is coded, in this embodiment of the present disclosure, a candidate intra-frame prediction direction of the target to-be-coded block can be determined.

Figure 3:
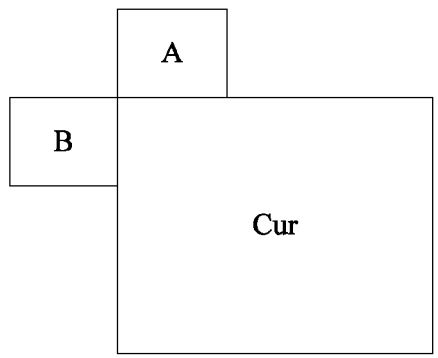
FIG. 3 is an example diagram of a reference coded block.

Optionally, in this embodiment of the present disclosure, a first coded block connected to a left side of an upper corner of the target to-be-coded block and a second coded block connected to an upper side of a left corner of the target to-be-coded block may be selected as the reference coded blocks. As shown in FIG. 3, a first coded block A connected to a left side of an upper corner of a target to-be-coded block cur and a second coded block B connected to an upper side of a left corner of the target to-be-coded block cur may be selected as the selected reference coded blocks spatially neighboring to the target to-be-coded block.

FIG. 3 shows only an example. During specific application, a quantity of the reference coded blocks may be one or at least two. Certainly, it is not limited to select the reference coded blocks shown in FIG. 3. The reference coded blocks shown in FIG. 3 and coded blocks connected to other corners of the target to-be-coded block may be used as the selected reference coded blocks. A specific manner may be determined according to an actual requirement.

After the reference coded blocks spatially neighboring to the target to-be-coded block are selected, the pixel main directions of the reference coded blocks in the reference coded blocks may be determined.

Optionally, for a reference coded block, in this embodiment of the present disclosure, directions of pixels of the reference coded block may be determined, and a direction with a largest quantity of pixels in the reference coded block is used as a pixel main direction of the reference coded block. The reference coded blocks are processed in this manner, to obtain the pixel main directions of the reference coded blocks.

Optionally, for a reference coded block, in this embodiment of the present disclosure, a Sobel operator (a Sobel algorithm is referred to as a Sobel operator and is one of the most important operators in pixel image edge detection) may be used to determine directions of pixels of the reference coded block.

Step S110: Separately search for an intra-frame prediction direction whose distance with the pixel main directions is within a set value, to obtain the intra-frame prediction directions correspondingly found through the pixel main directions.

Optionally, after the pixel main directions of the reference coded blocks are determined, for the pixel main directions (that is, the pixel main directions) of the reference coded blocks, in this embodiment of the present disclosure, the intra-frame prediction direction whose distance with the pixel main directions is within the set value is separately searched for by using the pixel main directions as centers, to obtain the intra-frame prediction direction correspondingly found through the pixel main directions. That is, an intra-frame prediction direction correspondingly found through the pixel main directions is: an intra-frame prediction direction that is found by using the pixel main directions as centers and whose distance with the pixel main directions is within the set value.

It may be understood that for a reference coded block, a pixel main direction of the reference coded block may correspond to an intra-frame prediction direction, to search for an intra-frame prediction direction (for example, searching is performed based on the intra-frame prediction directions shown in FIG. 1) whose distance with the pixel main directions is within the set value, to obtain the intra-frame prediction directions correspondingly found through the pixel main directions.

Optionally, searching for, by using the pixel main directions as centers, the intra-frame prediction direction whose distance with the pixel main directions is within the set value may be: for a pixel main direction, searching for an intra-frame prediction direction whose distance with the pixel main direction is less than the pixel main direction set value and an intra-frame prediction direction whose distance with the pixel main direction is greater than the pixel main direction set value, to obtain the intra-frame prediction directions correspondingly found through the pixel main direction.

Using an example in which the set value is 2, for a pixel main direction modA, intra-frame prediction directions that are found by using modA as a center and whose distances with modA are within the set value are: modA−2, modA−1, modA+1, and modA+2. That is, the intra-frame prediction directions correspondingly found through the pixel main direction modA are intra-frame prediction directions whose distances with modA are 2.

Step S120: Form candidate intra-frame prediction directions at least according to the intra-frame prediction directions correspondingly found through the pixel main directions and the pixel main directions.

After the intra-frame prediction directions correspondingly found through the pixel main directions are determined, in this embodiment of the present disclosure, at least the intra-frame prediction directions correspondingly found through the pixel main directions and the pixel main directions may be combined to form the candidate intra-frame prediction direction.

Optionally, in an implementation, the candidate intra-frame prediction directions may be formed by combining the intra-frame prediction directions correspondingly found through the pixel main directions and the pixel main directions. That is, the quantity of the candidate intra-frame prediction directions may be: a quantity of the intra-frame prediction directions correspondingly found through the pixel main directions plus a quantity of the pixel main directions.

Optionally, in another implementation, the candidate intra-frame prediction directions may be formed by combining the intra-frame prediction directions correspondingly found through the pixel main directions, the pixel main directions, a first set intra-frame prediction direction, and a second set intra-frame prediction direction. That is, a quantity of the candidate intra-frame prediction directions may be: the quantity of the intra-frame prediction directions correspondingly found through the pixel main directions plus the quantity of the pixel main directions and plus 2. Optionally, the first set intra-frame prediction direction is, for example, a direct current (DC) component prediction intra-frame prediction direction, and the second set intra-frame prediction direction is, for example, a planar prediction intra-frame prediction direction.

Optionally, the quantity of the candidate intra-frame prediction directions needs to be less than the quantity of all the intra-frame prediction directions. That is, in this embodiment of the present disclosure, regardless of any form for forming the candidate intra-frame prediction directions, the quantity of the candidate intra-frame prediction directions needs to be less than the quantity of all the intra-frame prediction directions. For example, using HEVC video coding as an example, the quantity of the candidate intra-frame prediction directions need to be less than 35. In this embodiment of the present disclosure, the quantity of the candidate intra-frame prediction directions may be controlled by setting the set value or controlled by setting the quantity of the reference coded blocks.

Optionally, in this embodiment of the present disclosure, a candidate list may be set, and the candidate intra-frame prediction directions formed at least according to the intra-frame prediction directions correspondingly found through the pixel main directions and the pixel main directions in step S130 are recorded in the candidate list.

Step S130: Perform prediction and coding on the target to-be-coded block according to the candidate intra-frame prediction directions, and determine a target intra-frame prediction direction in the candidate intra-frame prediction directions according to prediction and coding results respectively corresponding to the candidate intra-frame prediction directions.

After the candidate intra-frame prediction directions are determined, in this embodiment of the present disclosure, prediction and coding may be performed on the target to-be-coded block according to the candidate intra-frame prediction directions, to obtain prediction and coding results respectively corresponding to the candidate intra-frame prediction directions, and the target intra-frame prediction direction is determined in the candidate intra-frame prediction directions according to the prediction and coding results respectively corresponding to the candidate intra-frame prediction directions, to select the target intra-frame prediction direction of the target to-be-coded block in an intra-frame prediction process.

Optionally, in this embodiment of the present disclosure, rate distortion costs corresponding to the candidate intra-frame prediction directions may be determined according to the prediction and coding results respectively corresponding to the candidate intra-frame prediction directions, and a candidate intra-frame prediction direction with a smallest rate distortion cost is selected as the target intra-frame prediction direction.

After the target intra-frame prediction direction of the target to-be-coded block is determined, final prediction and coding may be performed on the target to-be-coded block by using the target intra-frame prediction direction, and the target intra-frame prediction direction of the target to-be-coded block may be written into a bitstream, to be transferred to a decoder to decode the coded target to-be-coded block.

The intra-frame prediction method provided in this embodiment of the present disclosure includes: determining pixel main directions of reference coded blocks in the reference coded blocks spatially neighboring to a target to-be-coded block, the target to-be-coded block being a to-be-coded block on which prediction and coding are to be performed; separately searching for an intra-frame prediction direction whose distance with the pixel main directions is within a set value, to obtain the intra-frame prediction directions correspondingly found through the pixel main directions; forming candidate intra-frame prediction directions at least according to the intra-frame prediction directions correspondingly found through the pixel main directions and the pixel main directions; and performing prediction and coding on the target to-be-coded block according to the candidate intra-frame prediction directions, and determining a target intra-frame prediction direction in the candidate intra-frame prediction directions according to prediction and coding results respectively corresponding to the candidate intra-frame prediction directions.

It may be learned that in the embodiments of the present disclosure, based on pixel main directions of reference coded blocks spatially neighboring to a target to-be-coded block, an intra-frame prediction direction whose distance with the pixel main directions is within a set value, and candidate intra-frame prediction directions are formed at least according to the intra-frame prediction directions correspondingly found through the pixel main directions and the pixel main directions, to perform prediction and coding on the target to-be-coded block according to the candidate intra-frame prediction directions, and a target intra-frame prediction direction is determined in the candidate intra-frame prediction directions according to prediction and coding results respectively corresponding to the candidate intra-frame prediction directions. In this embodiment of the present disclosure, the candidate intra-frame prediction directions may be formed at least according to the intra-frame prediction directions correspondingly found through the pixel main directions and the pixel main directions, a quantity of the candidate intra-frame prediction directions is reduced, and the target intra-frame prediction direction is controlled to make a choice directly based on the determined candidate intra-frame prediction directions, reducing a process of rough selection based on all the intra-frame prediction directions, lowering processing complexity of selection of the target intra-frame prediction direction, and lowering whole complexity of video coding, to ensure real-time of video coding.

Herein, the inventor finds that the target intra-frame prediction direction of the target to-be-coded block has a correlation with intra-frame prediction directions near the pixel main directions of the reference coded blocks spatially neighboring to the target to-be-coded block. Therefore, the intra-frame prediction directions whose distances with the pixel main directions are within the set value and that meet the correlation are searched for, and the candidate intra-frame prediction directions are formed at least according to the found intra-frame prediction directions and the pixel main directions, so that the candidate intra-frame prediction directions can include the target intra-frame prediction direction of the target to-be-coded block. Therefore, accuracy of the target intra-frame prediction direction determined based on the intra-frame prediction method provided in this embodiment of the present disclosure can be ensured.

Optionally, in an optional example, in this embodiment of the present disclosure, the first coded block connected to the left side of the upper corner of the target to-be-coded block and the second coded block connected to the upper side of the left corner of the target to-be-coded block may be selected as the selected reference coded blocks.

Figure 4:
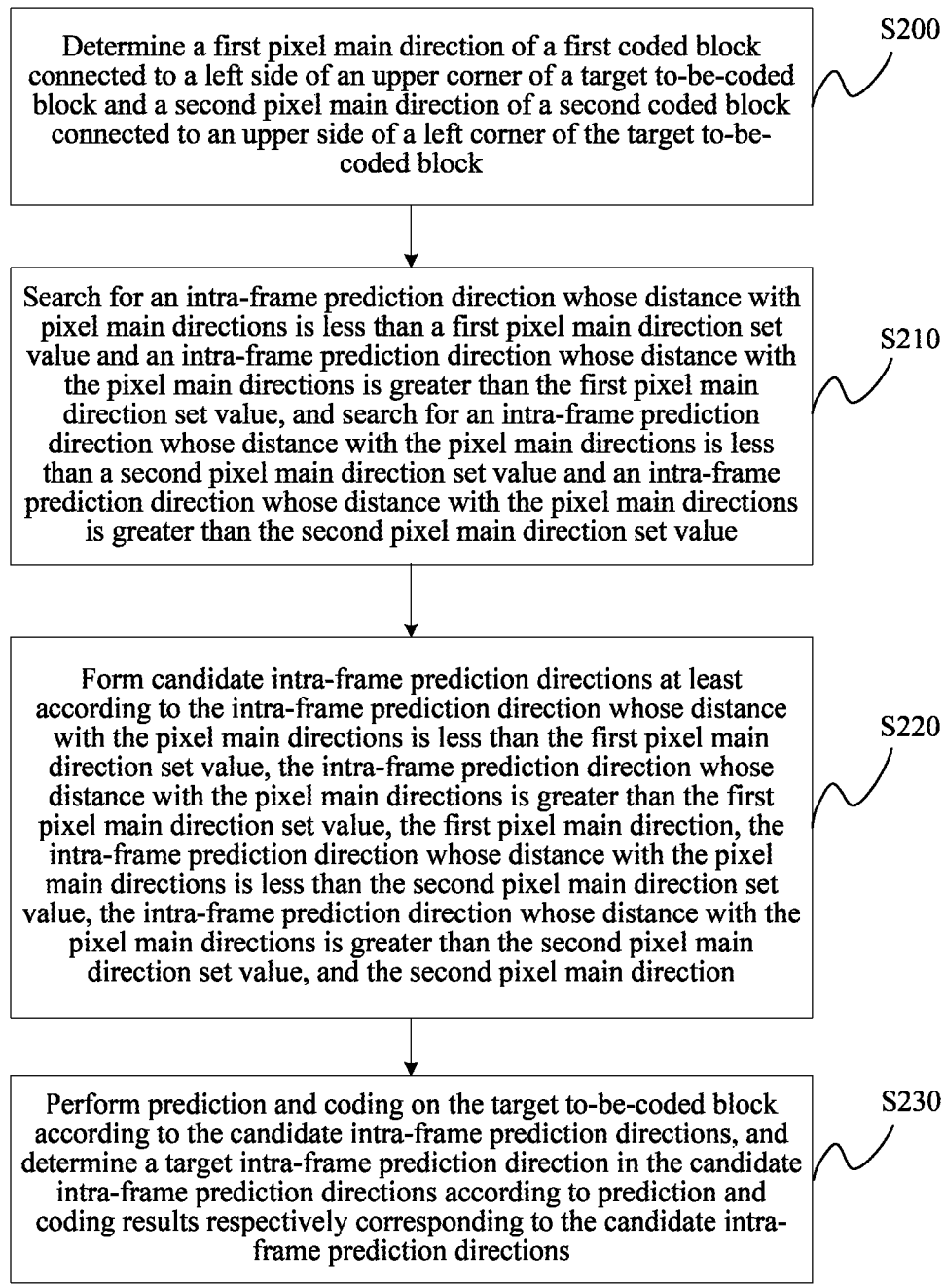
FIG. 4 is another flowchart of an intra-frame prediction method according to an embodiment of the present disclosure.

Optionally, FIG. 4 is another flowchart of an intra-frame prediction method according to an embodiment of the present disclosure. Referring to FIG. 4, the method may include:

Step S200: Determine a first pixel main direction of a first coded block connected to a left side of an upper corner of a target to-be-coded block and a second pixel main direction of a second coded block connected to an upper side of a left corner of the target to-be-coded block.

To facilitate description, in this embodiment of the present disclosure, a coded block connected to the left side of the upper corner of the target to-be-coded block may be referred to as the first coded block. As shown in FIG. 3, a coded block A is the first coded block. A coded block connected to the upper side of the left corner of the target to-be-coded block may be referred to as the second coded block. As shown in FIG. 3, a coded block B is the second coded block.

Optionally, in this embodiment of the present disclosure, a Sobel operator may be used to determine directions of pixels of the first coded block, and a direction with a largest quantity of pixels in the first coded block is used as a pixel main direction (referred to as the first pixel main direction) of the first coded block. In addition, the Sobel operator may be used to determine directions of pixels of the second coded block, and a direction with a largest quantity of pixels in the second coded block is used as a pixel main direction (referred to as the second pixel main direction) of the second coded block.

Step S210: Search for an intra-frame prediction direction whose distance with pixel main directions is less than a first pixel main direction set value and an intra-frame prediction direction whose distance with the pixel main directions is greater than the first pixel main direction set value, and search for an intra-frame prediction direction whose distance with the pixel main directions is less than a second pixel main direction set value and an intra-frame prediction direction whose distance with the pixel main directions is greater than the second pixel main direction set value.

Optionally, for the first pixel main direction, in this embodiment of the present disclosure, an intra-frame prediction direction whose distance with the first pixel main direction is minus the set value and an intra-frame prediction direction whose distance with the first pixel main direction is plus the set value, to obtain the intra-frame prediction directions correspondingly found through the first pixel main direction. For example, using an example in which the set value is 2, and the first pixel main direction is modA, intra-frame prediction directions of modA−2, modA−1, modA+1, and modA+2 may be found for modA.

For the second pixel main direction, in this embodiment of the present disclosure, an intra-frame prediction direction whose distance with the second pixel main direction is minus the set value and an intra-frame prediction direction whose distance with the second pixel main direction is plus the set value, to obtain the intra-frame prediction directions correspondingly found through the second pixel main direction. For example, using an example in which the set value is 2, and the second pixel main direction is modB, intra-frame prediction directions of modB−2, modB−1, modB+1, and modB+2 may be found for modB.

The selection of the specific value of the set value as 2 is only an optional example. In other examples, the specific value can be selected as 3, 4, or the like. This can be specifically determined according to an actual requirement.

Step S220: Form candidate intra-frame prediction directions at least according to the intra-frame prediction direction whose distance with the pixel main directions is less than the first pixel main direction set value, the intra-frame prediction direction whose distance with the pixel main directions is greater than the first pixel main direction set value, the first pixel main direction, the intra-frame prediction direction whose distance with the pixel main directions is less than the second pixel main direction set value, the intra-frame prediction direction whose distance with the pixel main directions is greater than the second pixel main direction set value, and the second pixel main direction.

Optionally, using an example in which the set value is 2, the first pixel main direction is modA, and the second pixel main direction is modB, in this embodiment of the present disclosure, the candidate intra-frame prediction directions may be formed at least according to modA−2, modA−1, modA, modA+1, modA+2, modB−2, modB−1, modB, modB+1, and modB+2.

In an optional example, a range for the candidate intra-frame prediction directions may be {modA−2, modA−1, modA, modA+1, modA+2, modB−2, modB−1, modB, modB+1, modB+2}.

In another optional example, the candidate intra-frame prediction directions may further combine the first set intra-frame prediction direction (such as a DC intra-frame prediction direction) and the second set intra-frame prediction direction (such as a planar intra-frame prediction direction). Correspondingly, the range for the candidate intra-frame prediction directions may be: {DC, planar, modA−2, modA−1, modA, modA+1, modA+2, modB−2, modB−1, modB, modB+1, modB+2}.

Therefore, the quantity of the candidate intra-frame prediction directions is less than the quantity of all the intra-frame prediction directions. Compared with all the intra-frame prediction directions (such as 35 intra-frame prediction directions in an HEVC situation), in the intra-frame prediction method provided in this embodiment of the present disclosure, the quantity of the determined candidate intra-frame prediction directions is greatly reduced.

Step S230: Perform prediction and coding on the target to-be-coded block according to the candidate intra-frame prediction directions, and determine a target intra-frame prediction direction in the candidate intra-frame prediction directions according to prediction and coding results respectively corresponding to the candidate intra-frame prediction directions.

A form of the reference coded blocks selected in the method of FIG. 4 is only exemplary. The form of the reference coded blocks may be determined according to a specific situation.

Optionally, in this embodiment of the present disclosure, after prediction and coding are performed on the target to-be-coded block according to the candidate intra-frame prediction directions, the target intra-frame prediction direction of the target to-be-coded block may be determined in the candidate intra-frame prediction directions in a rate distortion optimization (RDO) manner.

Figure 5:
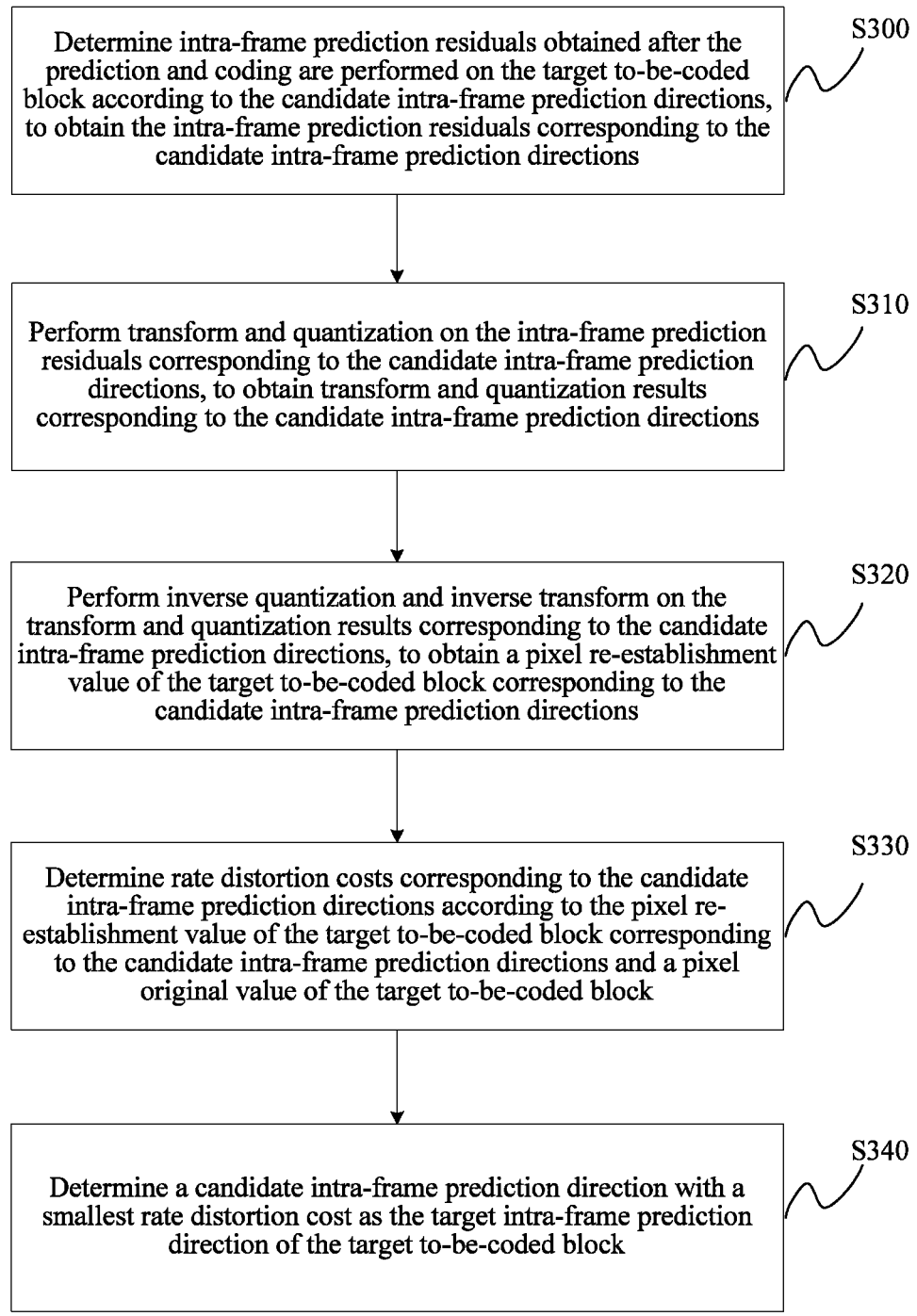
FIG. 5 is a flowchart of a method for determining a target intra-frame prediction direction in candidate intra-frame prediction directions.

Optionally, FIG. 5 shows a process of a method for determining the target intra-frame prediction direction in the candidate intra-frame prediction directions. Referring to FIG. 5, the method may include:

Step S300: Determine intra-frame prediction residuals obtained after the prediction and coding are performed on the target to-be-coded block according to the candidate intra-frame prediction directions, to obtain the intra-frame prediction residuals corresponding to the candidate intra-frame prediction directions.

In this embodiment of the present disclosure, after prediction and coding are performed on the target to-be-coded block according to the candidate intra-frame prediction directions, intra-frame prediction residuals (that is, intra-frame prediction residuals corresponding to the candidate intra-frame prediction directions) under the candidate intra-frame prediction directions may be obtained.

Step S310: Perform transform and quantization on the intra-frame prediction residuals corresponding to the candidate intra-frame prediction directions, to obtain transform and quantization results corresponding to the candidate intra-frame prediction directions.

When the intra-frame prediction residuals corresponding to the candidate intra-frame prediction directions are determined, in this embodiment of the present disclosure, transform and quantization may be performed on the intra-frame prediction residuals corresponding to the candidate intra-frame prediction directions, to obtain transform and quantization results corresponding to the candidate intra-frame prediction directions.

Step S320: perform inverse quantization and inverse transform on the transform and quantization results corresponding to the candidate intra-frame prediction directions, to obtain a pixel re-establishment value of the target to-be-coded block corresponding to the candidate intra-frame prediction directions.

After the transform and quantization results corresponding to the candidate intra-frame prediction directions are determined, in this embodiment of the present disclosure, inverse quantization and inverse transform may be performed on the transform and quantization results corresponding to the candidate intra-frame prediction directions, to obtain a pixel re-establishment value of the target to-be-coded block in the candidate intra-frame prediction directions.

Step S330: Determine rate distortion costs corresponding to the candidate intra-frame prediction directions according to the pixel re-establishment value of the target to-be-coded block corresponding to the candidate intra-frame prediction directions and a pixel original value of the target to-be-coded block.

Optionally, step S300 to step S330 may be regarded as an optional implementation of determining the rate distortion costs of the candidate intra-frame prediction directions according to the prediction and coding results corresponding to the candidate intra-frame prediction directions.

Step S340: Determine a candidate intra-frame prediction direction with a smallest rate distortion cost as the target intra-frame prediction direction of the target to-be-coded block.

After the pixel re-establishment value of the target to-be-coded block corresponding to the candidate intra-frame prediction directions is determined, for any candidate intra-frame prediction direction, in this embodiment of the present disclosure, a rate distortion (RD) cost based on a sum of square error (SSE) may be determined according to a pixel re-establishment value of a corresponding target to-be-coded block and a pixel original value of the target to-be-coded block, to obtain an RD cost corresponding to the candidate intra-frame prediction direction. In this way, RD costs corresponding to the candidate intra-frame prediction directions are determined, and a candidate intra-frame prediction direction with a smallest RD cost is determined as the target intra-frame prediction direction of the target to-be-coded block.

The foregoing manner of determining the target intra-frame prediction direction of the target to-be-coded block in an RDO manner is only optional. In this embodiment of the present disclosure, after prediction and coding are performed on the target to-be-coded block according to the candidate intra-frame prediction directions, costs in other forms (for example, directly using the intra-frame prediction residuals as a cost) corresponding to the candidate intra-frame prediction directions may be determined, and a candidate intra-frame prediction direction with a smallest cost is selected as the target intra-frame prediction direction of the target to-be-coded block.

Optionally, the method shown in FIG. 2 and FIG. 4 may be performed in no limitation condition. When intra-frame prediction currently needs to be performed on a to-be-coded block, intra-frame prediction may be directly performed on the to-be-coded block by using the method shown in FIG. 2 and FIG. 4. In this process, whether the first set intra-frame prediction direction and the second set intra-frame prediction direction are added into the candidate intra-frame prediction directions may be randomly selected.

In another implementation, the method shown in FIG. 2 and FIG. 4 may be performed when a limitation condition is met. That is, the intra-frame prediction method provided in this embodiment of the present disclosure is implemented through the method shown in FIG. 2 and FIG. 4 by setting a limitation condition only when the limitation condition is met.

Figure 6:
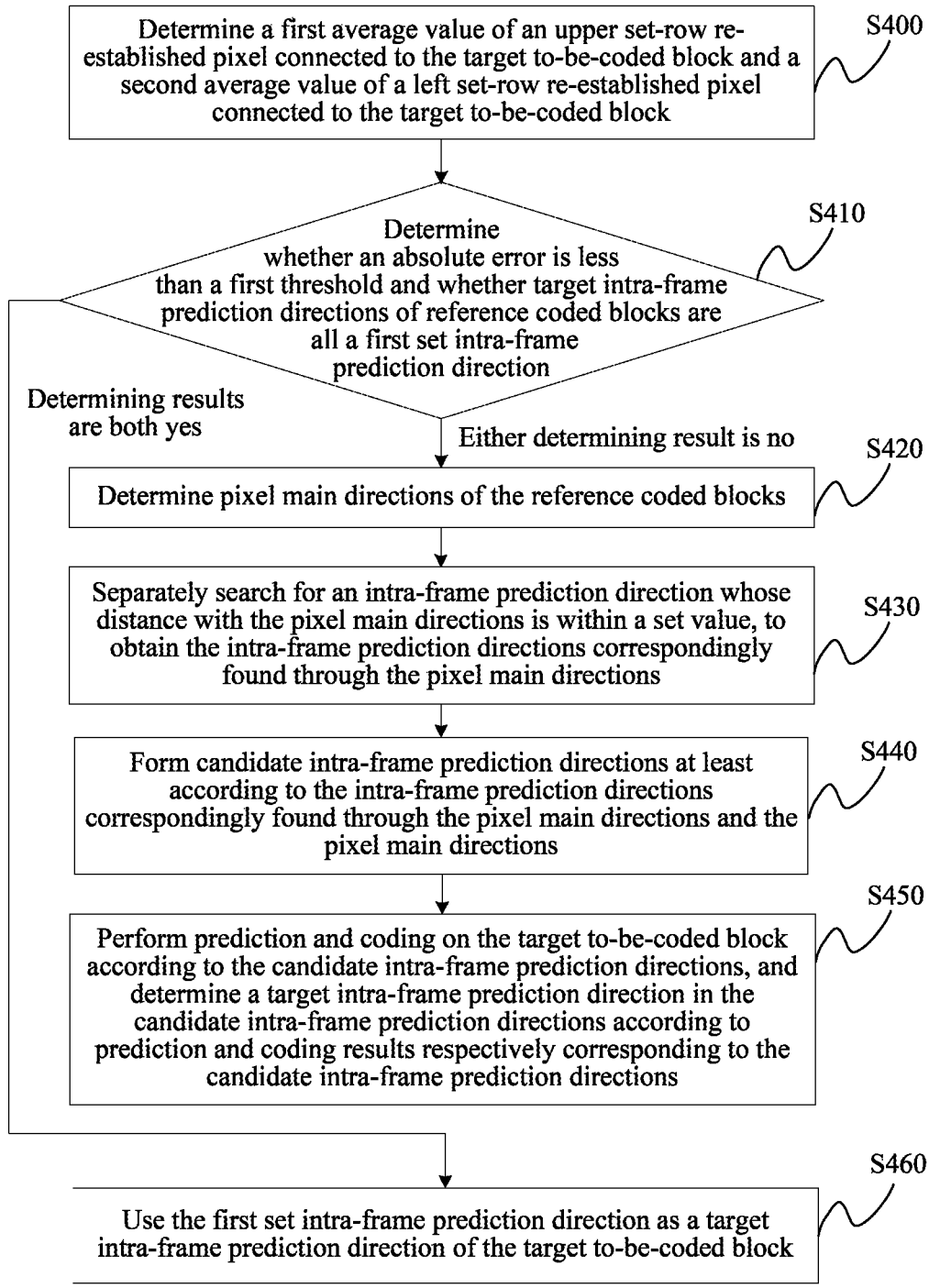
FIG. 6 is still another flowchart of an intra-frame prediction method according to an embodiment of the present disclosure.

Optionally, FIG. 6 is still another flowchart of an intra-frame prediction method according to an embodiment of the present disclosure. Referring to FIG. 6, the method may include:

Step S400: Determine a first average value of an upper set-row re-established pixel connected to the target to-be-coded block and a second average value of a left set-row re-established pixel connected to the target to-be-coded block.

Optionally, the upper set-row re-established pixel connected to the target to-be-coded block may be: an upper coded block of the target to-be-coded block or a set-row re-established pixel connected to the target to-be-coded block. Then, average values of the upper coded block of the target to-be-coded block and the set-row re-established pixel connected to the target to-be-coded block may be determined, to obtain the first average value.

The left set-row re-established pixel connected to the target to-be-coded block may be: a left coded block of the target to-be-coded block or a set-row re-established pixel connected to the target to-be-coded block. Then, average values of the left coded block of the target to-be-coded block and the set-row re-established pixel connected to the target to-be-coded block may be determined, to obtain the second average value.

Figure 7:
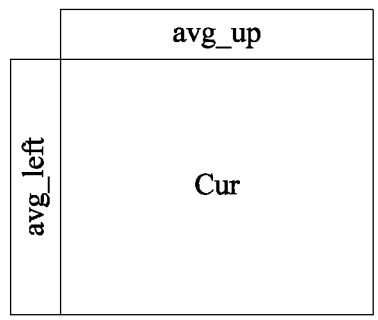
FIG. 7 is an example diagram of average values of re-established pixels in two upper lines and two left lines of a target to-be-coded block.

In an optional example, as shown in FIG. 7, in this embodiment of the present disclosure, average values of re-established pixels in two undermost lines of the upper coded block of the target to-be-coded block may be determined, to obtain the first average value (which may be referred as avg_up). In this embodiment of the present disclosure, average values of re-established pixels in two right-most lines of the left coded block of the target to-be-coded block may be determined, to obtain the second average value (which may be referred to as avg_left).

That is, the re-established pixels in two undermost lines of the upper coded block of the target to-be-coded block may be regarded as upper set-row re-established pixels connected to the target to-be-coded block, and the re-established pixels in two right-most lines of the left coded block of the target to-be-coded block may be regarded as left set-row re-established pixels connected to the target to-be-coded block.

In an example, a quantity of lines and columns of a to-be-coded block may be 16*16. One line has 16 pixels. The quantity of lines and columns of the to-be-coded block and a quantity of pixels in one line may be determined according to an actual situation. Only exemplary descriptions are provided herein.

Step S410: Determine whether an absolute error between the first average value and the second average value is less than a first threshold and whether target intra-frame prediction directions of reference coded blocks in the reference coded blocks spatially neighboring to the target to-be-coded block are all a first set intra-frame prediction direction; if either determining result is no, perform step S420; if determining results are both yes, perform step S460.

Step S420: Determine pixel main directions of the reference coded blocks.

If either determining result is no in step S410, it indicates that the absolute error between the first average value and the second average value is not less than the first threshold, and/or none of the target intra-frame prediction directions of the reference coded blocks is the first set intra-frame prediction direction. In this case, the process shown in FIG. 2 and FIG. 4 may be performed. That is, the pixel main directions of the reference coded blocks in the reference coded blocks may be first determined, and then the method is performed according to the process shown in FIG. 2 and FIG. 4.

Optionally, the first threshold may be set according to an actual situation. Because the absolute error between the first average value and the second average value is not less than the first threshold, and none of the target intra-frame prediction directions of the reference coded blocks is the first set intra-frame prediction direction (neither of the target intra-frame prediction directions of the first coded block and second coded blocks shown in FIG. 4 is the DC intra-frame prediction direction, and the DC intra-frame prediction direction may be used as the first set intra-frame prediction direction), a difference between re-established pixels of coded blocks spatially neighboring to the target to-be-coded block may be considered to be large. For the target to-be-coded block, a selection range of the intra-frame prediction directions needs to be expanded.

However, in this embodiment of the present disclosure, to lower processing complexity of selection of the target intra-frame prediction direction of the target to-be-coded block, the pixel main directions of the reference coded blocks are creatively first determined, and then an intra-frame prediction direction that may be added into the candidate intra-frame prediction directions is searched for by using the pixel main directions, so that the quantity of the candidate intra-frame prediction directions can be controlled.

Step S430: Separately search for an intra-frame prediction direction whose distance with the pixel main directions is within a set value, to obtain the intra-frame prediction directions correspondingly found through the pixel main directions.

Step S440: Form candidate intra-frame prediction directions at least according to the intra-frame prediction directions correspondingly found through the pixel main directions and the pixel main directions.

Step S450: Perform prediction and coding on the target to-be-coded block according to the candidate intra-frame prediction directions, and determine a target intra-frame prediction direction in the candidate intra-frame prediction directions according to prediction and coding results respectively corresponding to the candidate intra-frame prediction directions.

Step S460: Use the first set intra-frame prediction direction as a target intra-frame prediction direction of the target to-be-coded block.

If the determining results are both yes in step S410, it indicates that the absolute error between the first average value and the second average value is less than the first threshold, and the target intra-frame prediction directions of the reference coded blocks are all the first set intra-frame prediction direction, the difference between the re-established pixels of the coded blocks spatially neighboring to the target to-be-coded block may be considered to be small, and there is a large probability for the target intra-frame prediction direction of the target to-be-coded block to be consistent with the target intra-frame prediction direction of the reference coded block. Therefore, the target intra-frame prediction direction of the target to-be-coded block may be considered as the first set intra-frame prediction direction (for example, the target intra-frame prediction direction of the target to-be-coded block is the DC intra-frame prediction direction) used by the spatially neighboring reference coded blocks. Therefore, the first set intra-frame prediction direction may be used as the target intra-frame prediction direction of the target to-be-coded block, avoiding a process of determining the target intra-frame prediction direction by performing prediction and coding on the target to-be-coded blocks one by one based on the candidate intra-frame prediction directions, greatly reducing processing complexity.

Therefore, in this embodiment of the present disclosure, when the absolute error between the first average value and the second average value is not less than the first threshold, and/or none of the target intra-frame prediction directions of the reference coded blocks is the first set intra-frame prediction direction, the method shown in FIG. 1 and FIG. 4 is performed.

When the absolute error between the first average value and the second average value is less than the first threshold, and the target intra-frame prediction directions of the reference coded blocks are the first set intra-frame prediction direction, a parallel process different from the method shown in FIG. 1 and FIG. 4 is provided, that is, the first set intra-frame prediction direction is directly used as the target intra-frame prediction direction of the target to-be-coded block.

In an optional example of FIG. 6, using an example in which the at least one reference coded block is a first coded block A and a second coded block B, the first pixel main direction is modA, the second pixel main direction is modB, and the set value is 2, in this embodiment of the present disclosure, intra-frame prediction may be performed on the target to-be-coded block cur through the following process:

A first average value (defined as avg_up) of re-established pixel in two upper lines connected to the target to-be-coded block cur and a second average value (defined as avg_left) of a re-established pixel in two left lines connected to the target to-be-coded block cur.

If the absolute error between avg_up and avg_left is less than the first threshold (defined as Thd1), and the target intra-frame prediction directions of the first coded block A and the second coded block B are both the DC intra-frame prediction directions, it may be determined that the target intra-frame prediction direction of the target to-be-coded block cur is the DC intra-frame prediction direction. It may also be set that if the absolute error between avg_up and avg_left is less than Thd1, and the target intra-frame prediction directions of the first coded block A and the second coded block B are both the planar intra-frame prediction directions, it may be determined that the target intra-frame prediction direction of the target to-be-coded block cur is the planar intra-frame prediction direction.

If the absolute error between avg_up and avg_left is not less than Thd1, and/or neither of the target intra-frame prediction directions of the first coded block A and the second coded block B is the DC intra-frame prediction direction, a first pixel main direction modA of a first reference coded block A and a second pixel main direction modB of a second reference coded block B may be determined, and intra-frame prediction directions: modA−2, modA−1, modA+1, and modA+2 whose distances with modA are within 2 and intra-frame prediction directions: modB−2, modB−1, modB+1, and modB+2 whose distances with modB are within 2 are searched for, and the candidate intra-frame prediction directions are formed at least according to modA−2, modA−1, modA, modA+1, modA+2, modB−2, modB−1, modB, modB+1, and modB+2. Further, a target intra-frame prediction direction of the target to-be-coded block is determined in the candidate intra-frame prediction directions in a manner such as RDO.

In some cases, based on a determination that the absolute error between the first average value and the second average value is not less than the first threshold, and/or none of the target intra-frame prediction directions of the reference coded blocks is the first set intra-frame prediction direction, in this embodiment of the present disclosure, whether the first set intra-frame prediction direction and the second set intra-frame prediction direction (such as the DC and planar intra-frame prediction directions) are added into the candidate intra-frame prediction directions of the target to-be-coded block may also be selected.

Figure 8:
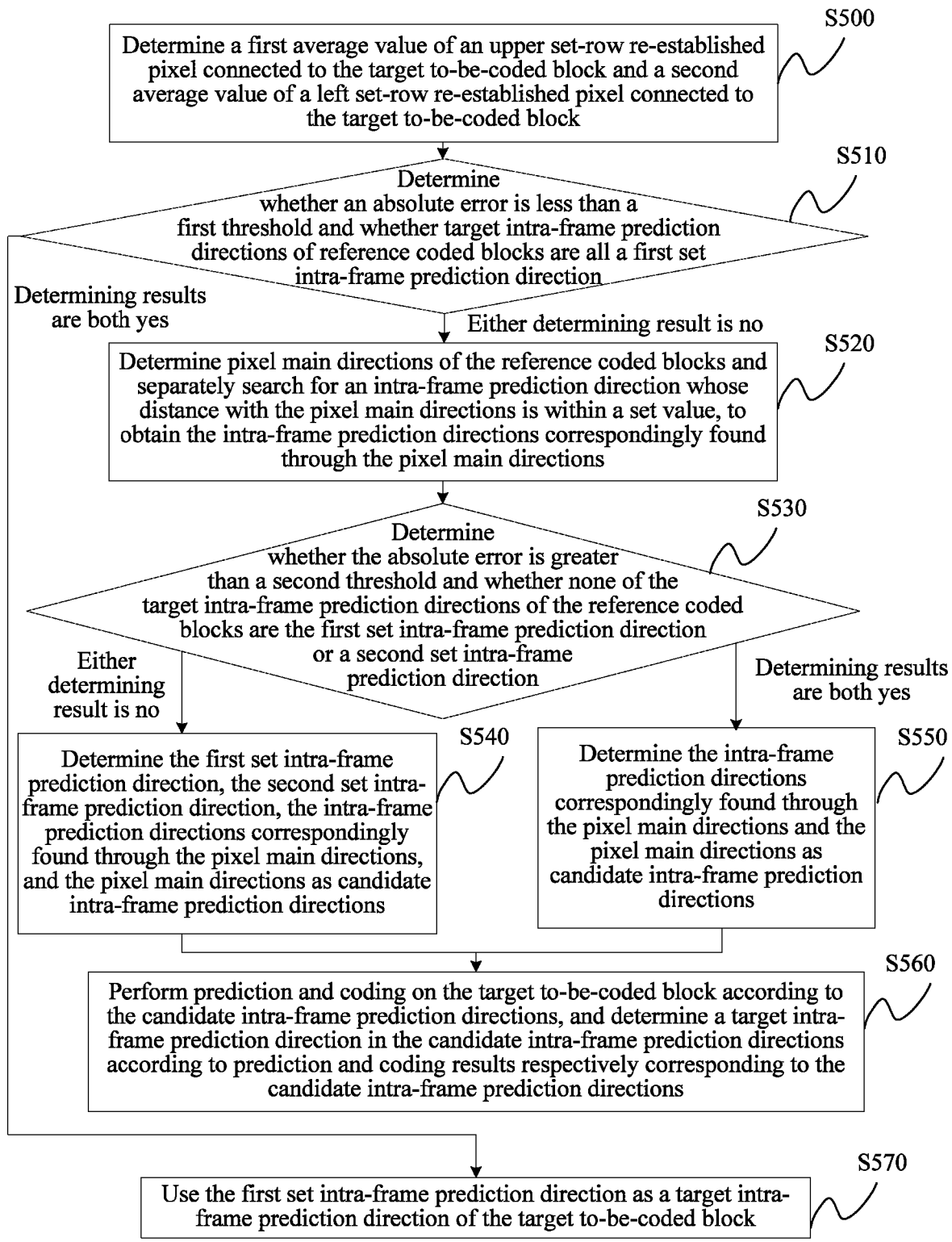
FIG. 8 is yet another flowchart of an intra-frame prediction method according to an embodiment of the present disclosure.

Optionally, FIG. 8 is yet another flowchart of an intra-frame prediction method according to an embodiment of the present disclosure. Referring to FIG. 8, the method may include:

Step S500: Determine a first average value of an upper set-row re-established pixel connected to the target to-be-coded block and a second average value of a left set-row re-established pixel connected to the target to-be-coded block.

Step S510: Determine whether an absolute error between the first average value and the second average value is less than a first threshold and whether target intra-frame prediction directions of reference coded blocks in the reference coded blocks spatially neighboring to the target to-be-coded block are all a first set intra-frame prediction direction; if any determining result is no, perform step S520; if determining results are both yes, perform step S570.

Step S520: Determine pixel main directions of the reference coded blocks and separately search for an intra-frame prediction direction whose distance with the pixel main directions is within a set value, to obtain the intra-frame prediction directions correspondingly found through the pixel main directions.

Step S530: Determine whether the absolute error between the first average value and the second average value is greater than a second threshold and whether none of the target intra-frame prediction directions of the reference coded blocks are the first set intra-frame prediction direction or a second set intra-frame prediction direction; if either determining result is no, perform step S540; if determining results are both yes, perform step S550.

Step S540: Determine the first set intra-frame prediction direction, the second set intra-frame prediction direction, the intra-frame prediction directions correspondingly found through the pixel main directions, and the pixel main directions as candidate intra-frame prediction directions.

Optionally, the first set intra-frame prediction direction, a second set intra-frame prediction direction, the intra-frame prediction directions correspondingly found through the pixel main directions, and the pixel main directions may be determined as the candidate intra-frame prediction directions in a case that the absolute error between the first average value and the second average value is not greater than a second threshold, and/or the target intra-frame prediction directions of the reference coded blocks are all the first set intra-frame prediction direction or the second set intra-frame prediction direction.

For example, in this embodiment of the present disclosure, when it is determined that the absolute error between the first average value and the second average value is not less than the first threshold and not greater than a second threshold, regardless of whether the target intra-frame prediction directions of the reference coded blocks are all the first set intra-frame prediction direction or the second set intra-frame prediction direction, the first set intra-frame prediction direction and the second set intra-frame prediction direction may be added into the candidate intra-frame prediction directions.

For another example, in this embodiment of the present disclosure, when it is determined that the absolute error between the first average value and the second average value is not less than the first threshold and greater than the second threshold, and the target intra-frame prediction directions of the reference coded blocks are all the first set intra-frame prediction direction or the second set intra-frame prediction direction, the first set intra-frame prediction direction and the second set intra-frame prediction direction may be added into the candidate intra-frame prediction directions.

For still another example, in this embodiment of the present disclosure, when it is determined that the target intra-frame prediction directions of the reference coded blocks are all the second set intra-frame prediction direction, the first set intra-frame prediction direction and the second set intra-frame prediction direction may be added into the candidate intra-frame prediction directions.

Step S550: Determine the intra-frame prediction directions correspondingly found through the pixel main directions and the pixel main directions as candidate intra-frame prediction directions.

Optionally, if the absolute error between the first average value and the second average value is greater than the second threshold, and none of the target intra-frame prediction directions of the reference coded blocks is the first set intra-frame prediction direction or the second set intra-frame prediction direction, the first set intra-frame prediction direction or the second set intra-frame prediction direction may be considered as not possibly the target intra-frame prediction direction of the target to-be-coded block, to directly determine the intra-frame prediction directions correspondingly found through the pixel main directions as the candidate intra-frame prediction directions.

Step S560: Perform prediction and coding on the target to-be-coded block according to the candidate intra-frame prediction directions, and determine a target intra-frame prediction direction in the candidate intra-frame prediction directions according to prediction and coding results respectively corresponding to the candidate intra-frame prediction directions.

Step S570: Use the first set intra-frame prediction direction as a target intra-frame prediction direction of the target to-be-coded block.

Optionally, in this embodiment of the present disclosure, a parallel process of using the first set intra-frame prediction direction as the target intra-frame prediction direction of the target to-be-coded block may be omitted, and determining of whether the absolute error between the first average value and the second average value is less than the first threshold, and whether the target intra-frame prediction directions of the reference coded blocks are all the first set intra-frame prediction direction is not first performed but the candidate intra-frame prediction directions are determined in the following manner.

The first set intra-frame prediction direction, a second set intra-frame prediction direction, the intra-frame prediction directions correspondingly found through the pixel main directions, and the pixel main directions are determined as the candidate intra-frame prediction directions in a case that the absolute error between the first average value and the second average value is not greater than a second threshold, and/or the target intra-frame prediction directions of the reference coded blocks are all the first set intra-frame prediction direction or the second set intra-frame prediction direction.

The intra-frame prediction directions correspondingly found through the pixel main directions and the pixel main directions are determined as the candidate intra-frame prediction directions in a case that the absolute error between the first average value and the second average value is greater than the second threshold, and none of the target intra-frame prediction directions of the reference coded blocks are the first set intra-frame prediction direction or the second set intra-frame prediction direction.

In this embodiment of the present disclosure, determining of the foregoing conditions may not be performed but whether the first set intra-frame prediction direction and the second set intra-frame prediction direction are added into the candidate intra-frame prediction directions is randomly selected.

The method shown in FIG. 6 and FIG. 8 is optional. In this embodiment of the present disclosure, when the intra-frame prediction method is implemented, the method shown in FIG. 2 may be performed to determine the target intra-frame prediction direction of the target to-be-coded block.

An application example of the intra-frame prediction method provided in this embodiment of the present disclosure may be: applied to a video coding device, when the video coding device performs video coding on a video image, any target to-be-coded block of the video image is coded by using an intra-frame prediction coding manner, and in this process, the intra-frame prediction method provided in this embodiment of the present disclosure is used to determine the target intra-frame prediction direction of the target to-be-coded block.

Figure 9:
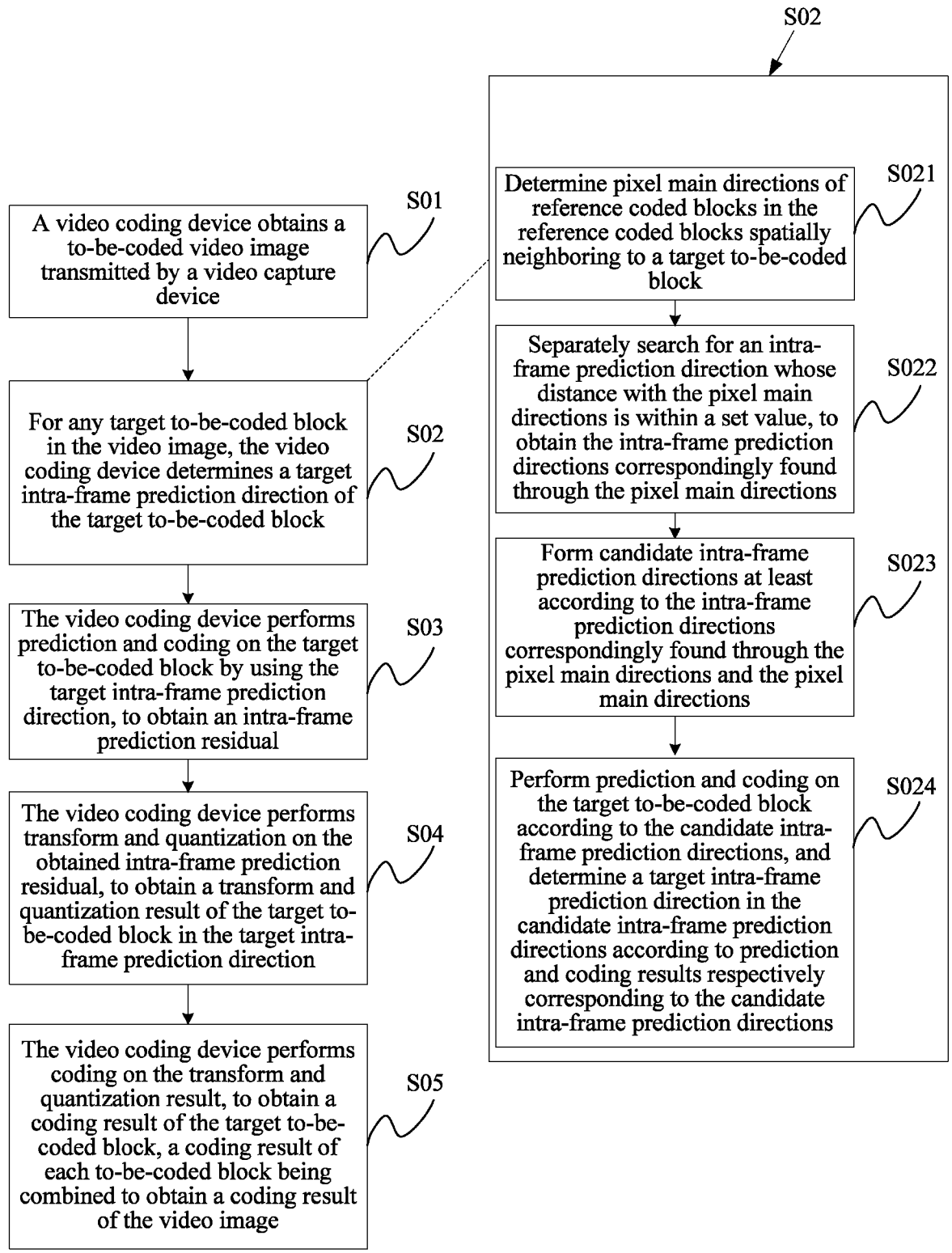
FIG. 9 is a schematic flowchart of an application example according to an embodiment of the present disclosure.

Optionally, in an application example, a video coding process to which the intra-frame prediction method provided in this embodiment of the present disclosure is applied may be as shown in FIG. 9 and include:

Step S01: A video coding device obtains a to-be-coded video image transmitted by a video capture device.

Optionally, after capturing the video image, the video capture device may transmit the captured video image to the video coding device, and the video coding device performs video coding in an intra-frame prediction coding manner.

Optionally, the video capture device may be a terminal device having an image capture apparatus such as a camera and may be, for example, a video capture terminal in video live scene. A source for the video coding device to obtain a to-be-coded video image is not limited to the to-be-coded video image. For example, the video coding device may re-code a saved video image.

Optionally, the video coding device may be implemented as a terminal such as a mobile phone or a notebook computer or may be a server disposed at a network side.

Step S02: For any to-be-coded target to-be-coded block in the video image, the video coding device determines a target intra-frame prediction direction of the target to-be-coded block.

After the video coding device obtains the to-be-coded video image, the video image may be coded by using a to-be-coded block as a unit. For example, after the video coding device obtains the video image, image segmentation may be performed on the video image, to obtain a plurality of to-be-coded blocks by division.

For any target to-be-coded block in the video image, the above-described intra-frame prediction method provided in this embodiment of the present disclosure may be used to determine the target intra-frame prediction direction of the target to-be-coded block.

Optionally, a process of determining the target intra-frame prediction direction of the target to-be-coded block may be shown in refinement of step S02 in FIG. 9 and includes:

Step S021: Determine pixel main directions of reference coded blocks in the reference coded blocks spatially neighboring to a target to-be-coded block.

Step S022: Separately search for an intra-frame prediction direction whose distance with the pixel main directions is within a set value, to obtain the intra-frame prediction directions correspondingly found through the pixel main directions.

Step S023: Form candidate intra-frame prediction directions at least according to the intra-frame prediction directions correspondingly found through the pixel main directions and the pixel main directions.

Step S024: Perform prediction and coding on the target to-be-coded block according to the candidate intra-frame prediction directions, and determine a target intra-frame prediction direction in the candidate intra-frame prediction directions according to prediction and coding results respectively corresponding to the candidate intra-frame prediction directions.

Optionally, for descriptions for refinement of step S021 to step S024, refer to descriptions of corresponding parts above.

Step S03: The video coding device performs prediction and coding on the target to-be-coded block by using the target intra-frame prediction direction, to obtain an intra-frame prediction residual.

After the video coding device determines the target intra-frame prediction direction of the target to-be-coded block, prediction and coding may be performed on the target to-be-coded block by using re-established pixels of coded blocks spatially neighboring to the target to-be-coded block according to the target intra-frame prediction direction, to obtain the intra-frame prediction residual of the target to-be-coded block in the target intra-frame prediction direction.

Step S04: The video coding device performs transform and quantization on the obtained intra-frame prediction residual, to obtain a transform and quantization result of the target to-be-coded block in the target intra-frame prediction direction.

After the intra-frame prediction residual of the target to-be-coded block in the target intra-frame prediction direction is obtained, the video coding device may perform transform (such as orthogonal transform) on the intra-frame prediction residual and then perform quantization (such as coefficient quantization), to obtain a transform and quantization result of the target to-be-coded block in the target intra-frame prediction direction.

Step S05: The video coding device performs coding on the transform and quantization result, to obtain a coding result of the target to-be-coded block.

Optionally, in this embodiment of the present disclosure, the transform and quantization result of the target to-be-coded block in the target intra-frame prediction direction may be coded in an entropy coding manner, to obtain the coding result of the target to-be-coded block.

Correspondingly, a coding result of each to-be-coded block is combined, to obtain a coding result of the video image.

Optionally, a target intra-frame prediction direction of each to-be-coded block in the video image may be written into a bitstream, to decode the coded video image. A process of decoding the coded video image may be reverse to the foregoing coding process. That is, processing reverse to the foregoing coding process may be performed on the coding result of each to-be-coded block in the coded video image.

Figure 10:
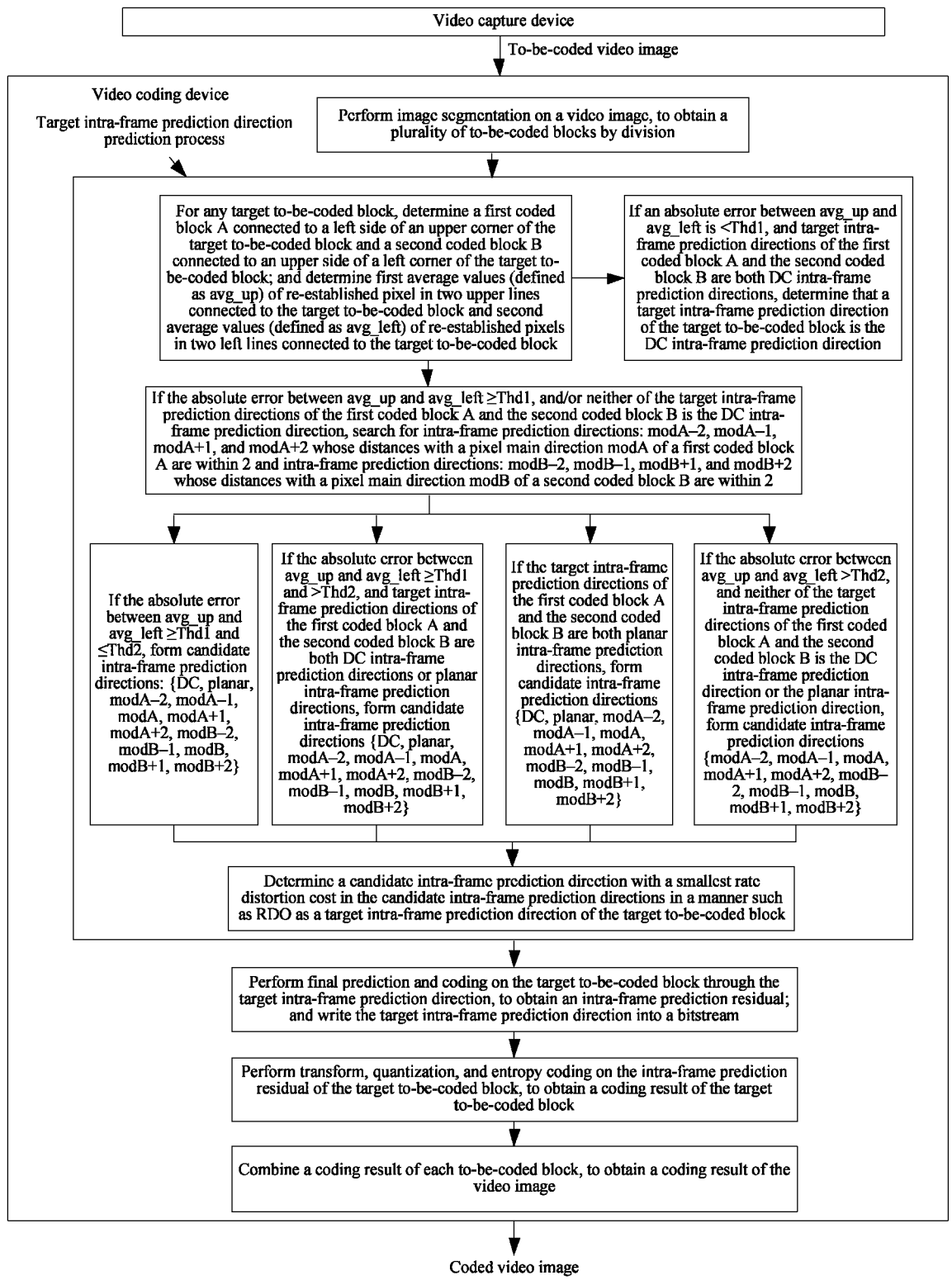
FIG. 10 is another schematic flowchart of an application example according to an embodiment of the present disclosure.

Based on the foregoing application example, the following uses an example in which the reference coded blocks are the first coded block A and the second coded block B, the first pixel main direction is modA, the second pixel main direction is modB, and the set value is 2 (the specific set value may be adjusted according to an actual situation), to describe a further defined process of performing video coding by using the intra-frame prediction method provided in this embodiment of the present disclosure. For a process of the application example, refer to FIG. 10. The process is specifically:

After the video capture device inputs the video image into the video coding device, the video coding device may perform image segmentation on the video image, to obtain a plurality of to-be-coded blocks by division.

For any target to-be-coded block, a first coded block A connected to a left side of an upper corner of the target to-be-coded block and a second coded block B connected to an upper side of a left corner of the target to-be-coded block are determined.

First average values (defined as avg_up) of re-established pixel in two upper lines connected to the target to-be-coded block and second average values (defined as avg_left) of re-established pixels in two left lines connected to the target to-be-coded block are determined.

If an absolute error between avg_up and avg_left is less than a first threshold (defined as Thd1), and target intra-frame prediction directions of the first coded block A and the second coded block B are both DC intra-frame prediction directions, it may be determined that a target intra-frame prediction direction of the target to-be-coded block is the DC intra-frame prediction direction.

If the absolute error between avg_up and avg_left is not less than Thd1, and/or neither of the target intra-frame prediction directions of the first coded block A and the second coded block B is the DC intra-frame prediction direction, in this embodiment of the present disclosure, a direction with a largest quantity of pixels in the first coded block A may be used as a pixel main direction modA of the first coded block, a direction with a largest quantity of pixels in the second coded block B may be used as a pixel main direction modB of the second coded block, and intra-frame prediction directions: modA−2, modA−1, modA+1, and modA+2 whose distances with modA are within 2 and intra-frame prediction directions: modB−2, modB−1, modB+1, and modB+2 whose distances with modB are within 2 are searched for. Subsequently, whether the DC intra-frame prediction direction and the planar intra-frame prediction direction are added into the candidate intra-frame prediction directions is determined according to a specific refinement situation, specifically as follows:

In a first situation, if the absolute error between avg_up and avg_left is not less than Thd1 and not greater than the second threshold (defined as Thd2), candidate intra-frame prediction directions {DC, planar, modA−2, modA−1, modA, modA+1, modA+2, modB−2, modB−1, modB, modB+1, modB+2} are formed.

In a second situation, if the absolute error between avg_up and avg_left is not less than Thd1 and greater than Thd2, and target intra-frame prediction directions of the first coded block A and the second coded block B are both DC intra-frame prediction directions or planar intra-frame prediction directions, candidate intra-frame prediction directions {DC, planar, modA−2, modA−1, modA, modA+1, modA+2, modB−2, modB−1, modB, modB+1, modB+2} are formed.

In a third situation, if the target intra-frame prediction directions of the first coded block A and the second coded block B are both planar intra-frame prediction directions, candidate intra-frame prediction directions {DC, planar, modA−2, modA−1, modA, modA+1, modA+2, modB−2, modB−1, modB, modB+1, modB+2} are formed.

In a fourth situation, if the absolute error between avg_up and avg_left is greater than Thd2, and neither of the target intra-frame prediction directions of the first coded block A and the second coded block B is the DC intra-frame prediction direction or the planar intra-frame prediction direction, candidate intra-frame prediction directions {modA−2, modA−1, modA, modA+1, modA+2, modB−2, modB−1, modB, modB+1, modB+2} are formed.

Based on the candidate intra-frame prediction directions formed in the foregoing situations, a candidate intra-frame prediction direction with a smallest rate distortion cost may be determined in the candidate intra-frame prediction directions in a manner such as RDO as a target intra-frame prediction direction of the target to-be-coded block.

After the target intra-frame prediction direction of the target to-be-coded block is determined, final prediction and coding may be performed on the target to-be-coded block through the target intra-frame prediction direction, to obtain an intra-frame prediction residual; and write the target intra-frame prediction direction into a bitstream.

Then, transform, quantization, and entropy coding are performed on the intra-frame prediction residual of the target to-be-coded block, to code the target to-be-coded block, to obtain a coding result of the target to-be-coded block.

A coding result of each to-be-coded block is combined, to obtain a coding result of the video image.

In the intra-frame prediction method provided in this embodiment of the present disclosure, the candidate intra-frame prediction directions may be formed at least according to the intra-frame prediction directions correspondingly found through the pixel main directions of the reference coded blocks in the reference coded blocks spatially neighboring to the target to-be-coded block, greatly reducing a quantity of the candidate intra-frame prediction directions and controlling the target intra-frame prediction direction to make a choice directly based on the determined candidate intra-frame prediction directions, thereby avoiding a process of rough selection based on all the intra-frame prediction directions, lowering processing complexity of selection of the target intra-frame prediction direction, and lowering whole complexity of video coding, to ensure real-time of video coding.

In some cases, when the absolute error between the first average value and the second average value is less than the first threshold, and the target intra-frame prediction directions of the reference coded blocks are all the first set intra-frame prediction direction, the target intra-frame prediction direction of the target to-be-coded block may be directly determined as a first intra-frame prediction direction, greatly lowering processing complexity.

The following describes an intra-frame prediction apparatus according to an embodiment of the present disclosure. The intra-frame prediction apparatus described in the following may be regarded as a video coding device and is programs and modules set to implement the intra-frame prediction method provided in this embodiment of the present disclosure. Cross reference may be made to content of the intra-frame prediction apparatus described in the following and the content of the intra-frame prediction method described above.

Figure 11:
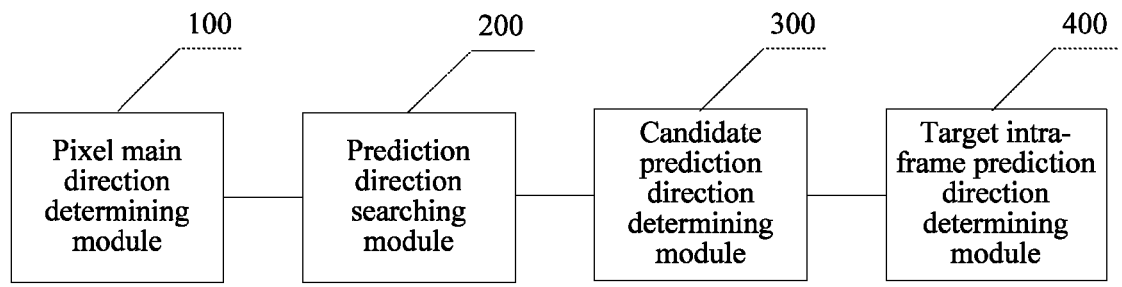
FIG. 11 is a structural block diagram of an intra-frame prediction apparatus according to an embodiment of the present disclosure.

FIG. 11 is a structural block diagram of an intra-frame prediction apparatus according to an embodiment of the present disclosure. The intra-frame prediction apparatus may be applied to a video coding device. Referring to FIG. 11, the intra-frame prediction apparatus may include:

a pixel main direction determining module 100, configured to determine pixel main directions of reference coded blocks in the reference coded blocks spatially neighboring to a target to-be-coded block;

a prediction direction searching module 200, configured to separately search for an intra-frame prediction direction whose distance with the pixel main directions is within a set value, to obtain the intra-frame prediction directions correspondingly found through the pixel main directions;

a candidate prediction direction determining module 300, configured to form candidate intra-frame prediction directions at least according to the intra-frame prediction directions correspondingly found through the pixel main directions and the pixel main directions; and a target intra-frame prediction direction determining module 400, configured to perform prediction and coding on the target to-be-coded block according to the candidate intra-frame prediction directions, and determine a target intra-frame prediction direction in the candidate intra-frame prediction directions according to prediction and coding results respectively corresponding to the candidate intra-frame prediction directions.

Optionally, the prediction direction searching module 200 may be specifically configured to:

separately search for, by using the pixel main directions as centers, the intra-frame prediction direction whose distance with the pixel main directions is within the set value, to obtain the intra-frame prediction directions correspondingly found through the pixel main directions.

More finely, the prediction direction searching module 200 may specifically configured to:

for any pixel main direction, search for an intra-frame prediction direction whose distance with the pixel main direction is less than a pixel main direction set value and an intra-frame prediction direction whose distance with the pixel main direction is greater than the pixel main direction set value, to obtain an intra-frame prediction direction correspondingly found through the pixel main direction.

Optionally, the pixel main direction determining module 100 may be specifically configured to:

for any reference coded block, determine directions of pixels of the reference coded block and use a direction with a largest quantity of pixels in the reference coded block as a pixel main direction of the reference coded block.

Figure 12:
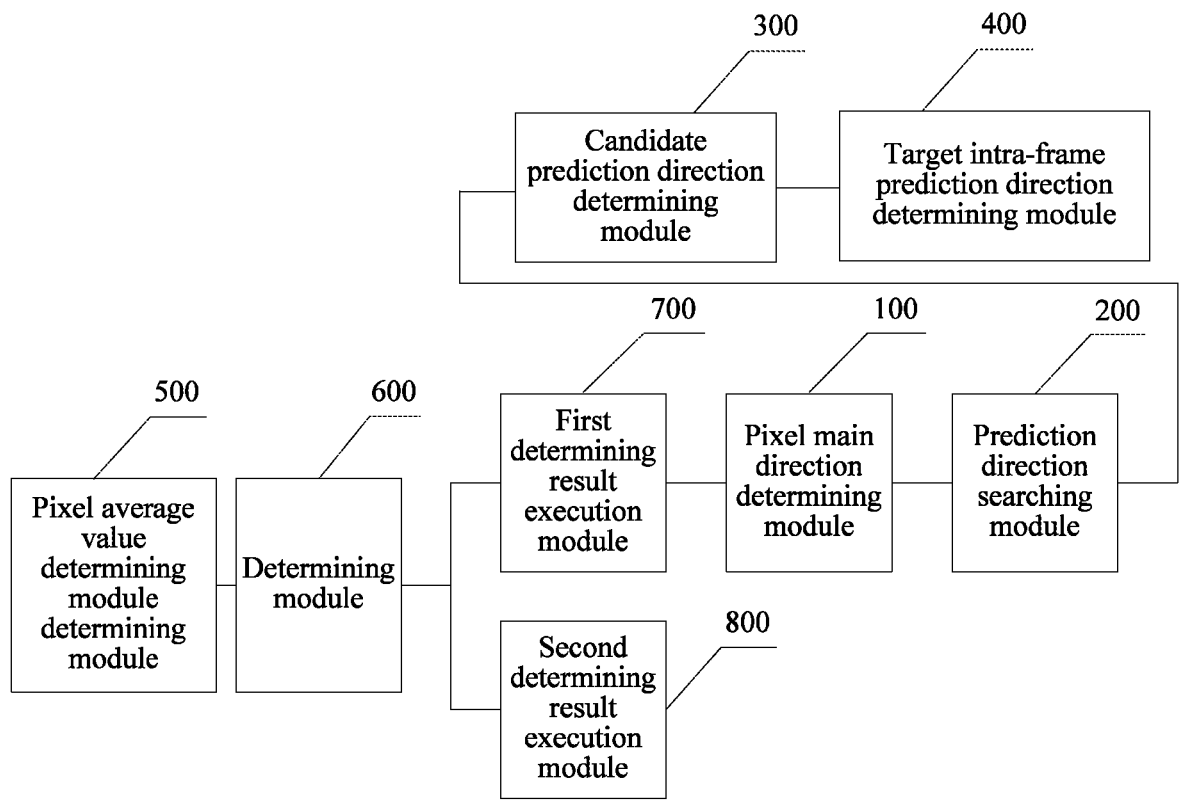
FIG. 12 is another structural block diagram of an intra-frame prediction apparatus according to an embodiment of the present disclosure.

Optionally, FIG. 12 is another structural block diagram of an intra-frame prediction apparatus according to an embodiment of the present disclosure. With reference to FIG. 11 and FIG. 12, the intra-frame prediction apparatus may further include:

a pixel average value determining module 500, configured to determine a first average value of an upper set-row re-established pixel connected to the target to-be-coded block and a second average value of a left set-row re-established pixel connected to the target to-be-coded block;

a determining module 600, configured to determine whether an absolute error between the first average value and the second average value is less than a first threshold and whether the target intra-frame prediction directions of the reference coded blocks are all a first set intra-frame prediction direction; and a first determining result execution module 700, configured to trigger the pixel main direction determining module to perform the operation of determining pixel main directions of reference coded blocks in the reference coded blocks spatially neighboring to a target to-be-coded block in a case that the determining module determines that the absolute error between the first average value and the second average value is not less than the first threshold, and/or none of the target intra-frame prediction directions of the reference coded blocks are the first set intra-frame prediction direction.

Optionally, with reference to FIG. 12, the intra-frame prediction apparatus shown in FIG. 12 may further include:

a second determining result execution module 800, configured to use the first set intra-frame prediction direction as a target intra-frame prediction direction of the target to-be-coded block in a case that the determining module determines that the absolute error between the first average value and the second average value is less than the first threshold, and the target intra-frame prediction directions of the reference coded blocks are all the first set intra-frame prediction direction.

Optionally, based on FIG. 12, the candidate prediction direction determining module 300 is specifically configured to:

determine the first set intra-frame prediction direction, a second set intra-frame prediction direction, the intra-frame prediction directions correspondingly found through the pixel main directions, and the pixel main directions as the candidate intra-frame prediction directions in a case that the absolute error between the first average value and the second average value is not greater than a second threshold, and/or the target intra-frame prediction directions of the reference coded blocks are all the first set intra-frame prediction direction or the second set intra-frame prediction direction; and determine the intra-frame prediction directions correspondingly found through the pixel main directions and the pixel main directions as the candidate intra-frame prediction directions in a case that the absolute error between the first average value and the second average value is greater than the second threshold, and none of the target intra-frame prediction directions of the reference coded blocks are the first set intra-frame prediction direction or the second set intra-frame prediction direction.

Optionally, a specific content for the candidate prediction direction determining module 300 determine the candidate intra-frame prediction directions may be independently implemented.

Optionally, the candidate prediction direction determining module 300 may also randomly select whether the first set intra-frame prediction direction and the second set intra-frame prediction direction are added in the candidate intra-frame prediction directions. This may be specifically determined according to an actual requirement.

Optionally, the reference coded blocks may include a first coded block connected to a left side of an upper corner of the target to-be-coded block and a second coded block connected to an upper side of a left corner of the target to-be-coded block.

Optionally, the target intra-frame prediction direction determining module 400 is specifically configured to:

determine rate distortion costs corresponding to the candidate intra-frame prediction directions according to prediction and coding results respectively corresponding to the candidate intra-frame prediction directions; and select a candidate intra-frame prediction direction with a smallest rate distortion cost as the target intra-frame prediction direction.

Optionally, the target intra-frame prediction direction determining module 400 is specifically configured to:

determine intra-frame prediction residuals obtained after the prediction and coding are performed on the target to-be-coded block according to the candidate intra-frame prediction directions, to obtain the intra-frame prediction residuals corresponding to the candidate intra-frame prediction directions;

perform transform and quantization on the intra-frame prediction residuals corresponding to the candidate intra-frame prediction directions, to obtain transform and quantization results corresponding to the candidate intra-frame prediction directions; and perform inverse quantization and inverse transform on the transform and quantization results corresponding to the candidate intra-frame prediction directions, to obtain a pixel re-establishment value of the target to-be-coded block corresponding to the candidate intra-frame prediction directions; and determine rate distortion costs corresponding to the candidate intra-frame prediction directions according to the pixel re-establishment value of the target to-be-coded block corresponding to the candidate intra-frame prediction directions and a pixel original value of the target to-be-coded block.

The intra-frame prediction apparatus provided in this embodiment of the present disclosure can lower selection complexity of the target intra-frame prediction direction, so that complexity of video coding is lowered, meeting a real-time requirement of video coding.

An embodiment of the present disclosure further provides a video coding device. The video coding device may perform the intra-frame prediction method provided in this embodiment of the present disclosure by loading a program for implementing the foregoing program module functions. The video coding device may be implemented as a terminal such as a mobile phone a notebook computer or may be a server.

Figure 13:
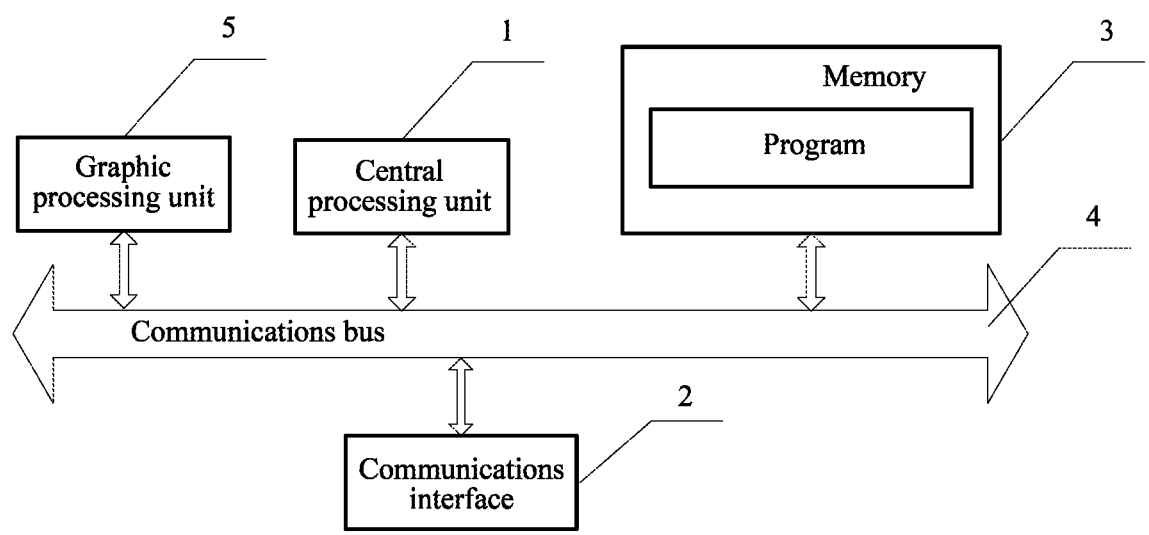
FIG. 13 is a structural block diagram of hardware of a video coding device.

FIG. 13 is a structural block diagram of hardware of a video coding device. Referring to FIG. 13, the video coding device may include at least one central processing unit 1, at least one communications interface 2, at least one memory 3, at least one communications bus 4, and at least one graphic processing unit 5. The at least one central processing unit 1 and/or at least one graphic processing unit 5 are examples of processing circuitry of the video coding device.

In this embodiment of the present disclosure, there may be at least one processor (or central processing unit) 1, communications interface 2, memory 3, communications bus 4, and graphic processing unit 5, and the processor 1, the communications interface 2, and the memory 3 complete mutual communication through the communications bus 4.

The memory stores a program used for execution by a central processing unit or a graphic processing unit. The program is used for:

determining pixel main directions of reference coded blocks in the reference coded blocks spatially neighboring to a target to-be-coded block;

separately searching for an intra-frame prediction direction whose distance with the pixel main directions is within a set value, to obtain the intra-frame prediction directions correspondingly found through the pixel main directions;

forming candidate intra-frame prediction directions at least according to the intra-frame prediction directions correspondingly found through the pixel main directions and the pixel main directions; and performing prediction and coding on the target to-be-coded block according to the candidate intra-frame prediction directions, and determining a target intra-frame prediction direction in the candidate intra-frame prediction directions according to prediction and coding results respectively corresponding to the candidate intra-frame prediction directions.

Optionally, for fining functions and expansion functions of the program, refer to descriptions of corresponding parts above.

An embodiment of the present disclosure further provides a storage medium (e.g., a non-transitory computer-readable storage medium), storing a program used for execution by a central processing unit or a graphic processing unit, the program being used for performing any implementation in the intra-frame prediction method in the foregoing embodiments.

An embodiment of the present disclosure further provides a computer program product, including an instruction, when being run on a computer, causing the computer to perform any implementation in the intra-frame prediction method in the foregoing embodiments.

Optionally, for fining functions and expansion functions of the program, refer to descriptions of corresponding parts above.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

A person skilled in the art may further realize that, in combination with the embodiments herein, units and algorithm, steps of each example described can be implemented with electronic hardware (e.g., processing circuitry), computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art can use different methods to implement the described functions for each particular application, but it is not to be considered that the implementation goes beyond the scope of the embodiments of the present disclosure.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium (e.g., a non-transitory computer-readable storage medium) of other forms well-known in the technical field.

The above descriptions of the disclosed embodiments are intended to aid a person skilled in the art implement or use the present disclosure. Various modifications to these embodiments are envisioned, and the general principles defined in this specification may be implemented in other embodiments without departing from the core idea and scope of the present disclosure. Therefore, the present disclosure is not limited to these embodiments illustrated in the present disclosure, but needs to conform to the broadest scope consistent with the principles and novel features disclosed in the present disclosure.

What is claimed is:

1. An intra-frame prediction method of a video coding device, the method comprising:
    determining a pixel main direction for each of a plurality of reference coded blocks that spatially neighbor a target to-be-coded block;
    searching for an intra-frame prediction direction that is within a set distance value of each of the pixel main directions;
    forming candidate intra-frame prediction directions at least according to the intra-frame prediction directions within the set distance value of the pixel main directions;
    performing prediction and coding on the target to-be-coded block according to the candidate intra-frame prediction directions; and
    determining a target intra-frame prediction direction in the candidate intra-frame prediction directions according to results of the prediction and coding on the target to-be-coded block according to the candidate intra-frame prediction directions, wherein
    the determining the pixel main direction includes, for a reference coded block of the reference coded blocks, determining directions from the target to-be-coded block to pixels of the reference coded block and using one of the directions with a largest quantity of pixels in the reference coded block as the pixel main direction of the reference coded block.

2. The intra-frame prediction method according to claim 1, wherein the searching comprises:
    for one of the pixel main directions, searching for the intra-frame prediction direction with a distance value that is less than a pixel main direction set value of the one of the pixel main directions and another intra-frame prediction direction with a distance value that is greater than the pixel main direction set value of the one of the pixel main directions.

3. The intra-frame prediction method according to claim 1, further comprising:
    determining a first average value of an upper set-row re-established pixel connected to the target to-be-coded block and a second average value of a left set-row re-established pixel connected to the target to-be-coded block;
    determining whether an absolute error between the first average value and the second average value is less than a first threshold and whether the target intra-frame prediction directions of the reference coded blocks are all a first intra-frame prediction direction; and
    triggering performing of the determining the pixel main direction of each of the reference coded blocks in a case that at least one of (i) the absolute error between the first average value and the second average value is not less than the first threshold, or (ii) none of the target intra-frame prediction directions of the reference coded blocks are the first intra-frame prediction direction.

4. The intra-frame prediction method according to claim 3, wherein
    the target intra-frame prediction direction of the target to-be-coded block is the first intra-frame prediction direction in a case that (i) the absolute error between the first average value and the second average value is less than the first threshold, and (ii) the target intra-frame prediction directions of the reference coded blocks are all the first intra-frame prediction direction.

5. The intra-frame prediction method according to claim 3, wherein the forming comprises:
    determining the candidate intra-frame prediction directions include the first intra-frame prediction direction, a second intra-frame prediction direction, the intra-frame prediction directions, and the pixel main directions in a case that at least one of (i) the absolute error between the first average value and the second average value is not greater than a second threshold, or (ii) the target intra-frame prediction directions of the reference coded blocks are all the first intra-frame prediction direction or the second intra-frame prediction direction; and
    determining the candidate intra-frame prediction directions include the intra-frame prediction directions and the pixel main directions in a case that (i) the absolute error between the first average value and the second average value is greater than the second threshold, and (ii) none of the target intra-frame prediction directions of the reference coded blocks are the first intra-frame prediction direction or the second intra-frame prediction direction.

6. The intra-frame prediction method according to claim 1, wherein the reference coded blocks comprise a first coded block connected to a left side of an upper corner of the target to-be-coded block and a second coded block connected to an upper side of a left corner of the target to-be-coded block.

7. The intra-frame prediction method according to claim 1, wherein the determining the target intra-frame prediction direction comprises:
determining rate distortion costs corresponding to the candidate intra-frame prediction directions according to the results of the prediction and coding on the target to-be-coded block according to the candidate intra-frame prediction directions; and
selecting one of the candidate intra-frame prediction directions with a smallest rate distortion cost as the target intra-frame prediction direction.

8. The intra-frame prediction method according to claim 7, wherein the determining the rate distortion costs comprises:
determining intra-frame prediction residuals corresponding to the candidate intra-frame prediction directions obtained after the prediction and coding are performed on the target to-be-coded block according to the candidate intra-frame prediction directions;
performing transform and quantization on the intra-frame prediction residuals corresponding to the candidate intra-frame prediction directions, to obtain transform and quantization results corresponding to the candidate intra-frame prediction directions;
performing inverse quantization and inverse transform on the transform and quantization results corresponding to the candidate intra-frame prediction directions, to obtain a pixel re-establishment value of the target to-be-coded block corresponding to the candidate intra-frame prediction directions; and
determining rate distortion costs corresponding to the candidate intra-frame prediction directions according to the pixel re-establishment value of the target to-be-coded block corresponding to the candidate intra-frame prediction directions and a pixel original value of the target to-be-coded block.

9. An information processing apparatus, comprising:
processing circuitry configured to
determine a pixel main direction for each of a plurality of reference coded blocks that spatially neighbor a target to-be-coded block;
search for an intra-frame prediction direction that is within a set distance value of each of the pixel main directions;
form candidate intra-frame prediction directions at least according to the intra-frame prediction directions within the set distance value of the pixel main directions;
perform prediction and coding on the target to-be-coded block according to the candidate intra-frame prediction directions; and
determine a target intra-frame prediction direction in the candidate intra-frame prediction directions according to results of the prediction and coding on the target to-be-coded block according to the candidate intra-frame prediction directions, wherein
the processing circuitry is configured to, for a reference coded block of the reference coded blocks, determine directions from the target to-be-coded block to pixels of the reference coded block and use one of the directions with a largest quantity of pixels in the reference coded block as the pixel main direction of the reference coded block.

10. The information processing apparatus according to claim 9, wherein the processing circuitry is configured to:
for one of the pixel main directions, search for the intra-frame prediction direction with a distance value that is less than a pixel main direction set value of the one of the pixel main directions and another intra-frame prediction direction with a distance value that is greater than the pixel main direction set value of the one of the pixel main directions.

11. The information processing apparatus according to claim 9, wherein the processing circuitry is configured to
determine a first average value of an upper set-row re-established pixel connected to the target to-be-coded block and a second average value of a left set-row re-established pixel connected to the target to-be-coded block:
determine whether an absolute error between the first average value and the second average value is less than a first threshold and whether the target intra-frame prediction directions of the reference coded blocks are all a first intra-frame prediction direction; and
trigger the determination of the pixel main directions of the reference coded blocks in a case that at least one of (i) the absolute error between the first average value and the second average value is not less than the first threshold, or (ii) none of the target intra-frame prediction directions of the reference coded blocks are the first intra-frame prediction direction.

12. The information processing apparatus according to claim 11, wherein
the target intra-frame prediction direction of the target to-be-coded block is the first intra-frame prediction direction in a case that (i) the absolute error between the first average value and the second average value is less than the first threshold, and (ii) the target intra-frame prediction directions of the reference coded blocks are all the first intra-frame prediction direction.

13. The information processing apparatus according to claim 11, wherein the processing circuitry is configured to
determine the candidate intra-frame prediction directions include the first intra-frame prediction direction, a second intra-frame prediction direction, the intra-frame prediction directions, and the pixel main directions in a case that at least one of (i) the absolute error between the first average value and the second average value is not greater than a second threshold, or (ii) the target intra-frame prediction directions of the reference coded blocks are all the first intra-frame prediction direction or the second intra-frame prediction direction; and
determine the candidate intra-frame prediction directions include the intra-frame prediction directions and the pixel main directions in a case that (i) the absolute error between the first average value and the second average value is greater than the second threshold, and (ii) none of the target intra-frame prediction directions of the reference coded blocks are the first intra-frame prediction direction or the second intra-frame prediction direction.

14. The information processing apparatus according to claim 10, wherein the reference coded blocks comprise a first coded block connected to a left side of an upper corner of the target to-be-coded block and a second coded block connected to an upper side of a left corner of the target to-be-coded block.

15. The information processing apparatus according to claim 10, wherein the processing circuitry is configured to
determine rate distortion costs corresponding to the candidate intra-frame prediction directions according to the results of the prediction and code on the target to-be-coded block according to the candidate intra-frame prediction directions; and
select one of the candidate intra-frame prediction directions with a smallest rate distortion cost as the target intra-frame prediction direction.

16. The information processing apparatus according to claim 15, wherein the processing circuitry is configured to
determine intra-frame prediction residuals corresponding to the candidate intra-frame prediction directions obtained after the prediction and coding are performed on the target to-be-coded block according to the candidate intra-frame prediction directions;
perform transform and quantization on the intra-frame prediction residuals corresponding to the candidate intra-frame prediction directions, to obtain transform and quantization results corresponding to the candidate intra-frame prediction directions;
perform inverse quantization and inverse transform on the transform and quantization results corresponding to the candidate intra-frame prediction directions, to obtain a pixel re-establishment value of the target to-be-coded block corresponding to the candidate intra-frame prediction directions; and
determine rate distortion costs corresponding to the candidate intra-frame prediction directions according to the pixel re-establishment value of the target to-be-coded block corresponding to the candidate intra-frame prediction directions and a pixel original value of the target to-be-coded block.

17. A non-transitory computer-readable storage medium, storing instructions which when executed by at least one processor cause the at least one processor to perform:
determining a pixel main direction for each of a plurality of reference coded blocks that spatially neighbor a target to-be-coded block;
searching for an intra-frame prediction direction that is within a set distance value of each of the pixel main directions;
forming candidate intra-frame prediction directions at least according to the intra-frame prediction directions within the set distance value of the pixel main directions;
performing prediction and coding on the target to-be-coded block according to the candidate intra-frame prediction directions; and
determining a target intra-frame prediction direction in the candidate intra-frame prediction directions according to results of the prediction and coding on the target to-be-coded block according to the candidate intra-frame prediction directions, wherein
the determining the pixel main direction includes, for a reference coded block of the reference coded blocks, determining directions from the target to-be-coded block to pixels of the reference coded block and using one of the directions with a largest quantity of pixels in the reference coded block as the pixel main direction of the reference coded block.

18. The non-transitory computer-readable storage medium according to claim 17, wherein the searching comprises:
for one of the pixel main directions, searching for the intra-frame prediction direction with a distance value that is less than a pixel main direction set value of the one of the pixel main directions and another intra-frame prediction direction with a distance value that is greater than the pixel main direction set value of the one of the pixel main directions.

19. The intra-frame prediction method according to claim 1, wherein the reference coded block is adjacent to a top left corner of the target to-be-coded block.

20. The intra-frame prediction method according to claim 1, wherein the searching comprises:
searching for a plurality of intra-frame prediction directions that is within the set distance value of each of the pixel main directions, the respective pixel main direction being between the plurality of intra-frame prediction directions of the respective pixel main direction.

* * * * *